(12) United States Patent
Taveira et al.

(10) Patent No.: US 12,038,749 B2
(45) Date of Patent: Jul. 16, 2024

(54) DETERMINING DROP-OFF OR PICK-UP LOCATIONS FOR PASSENGERS OF VEHICLES

(71) Applicant: QUALCOMM Incorporated, San Diego, CA (US)

(72) Inventors: Michael Franco Taveira, San Diego, CA (US); Vishnu Vardhan Kasilya Sudarsan, Bangalore (IN); Hariprasad K, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 17/146,725

(22) Filed: Jan. 12, 2021

(65) Prior Publication Data

US 2022/0221867 A1 Jul. 14, 2022

(51) Int. Cl.
 *G05D 1/00* (2024.01)
 *G01C 21/34* (2006.01)
 (Continued)

(52) U.S. Cl.
 CPC ....... *G05D 1/0214* (2013.01); *G01C 21/3461* (2013.01); *G06Q 10/02* (2013.01);
 (Continued)

(58) Field of Classification Search
 CPC .............. G05D 1/0214; G01C 21/3461; G01C 1/3461; G06Q 10/02; G06Q 10/06315; G06Q 50/265; G06Q 50/30; G06Q 50/40
 (Continued)

(56) References Cited

U.S. PATENT DOCUMENTS

| 9,733,096 B2 | 8/2017 | Colijn et al. |
| 9,958,870 B1 | 5/2018 | Graybill et al. |

(Continued)

FOREIGN PATENT DOCUMENTS

| DE | 102018212901 A1 | 2/2020 |
| JP | 2019212118 A | * 12/2019 |

(Continued)

OTHER PUBLICATIONS

Translation of WO-2020001846-A1.*
(Continued)

*Primary Examiner* — Krishnan Ramesh
(74) *Attorney, Agent, or Firm* — QUALCOMM Incorporated

(57) ABSTRACT

This disclosure provides systems, methods, and apparatuses for controlling operations of a vehicle configured for passenger service. In some implementations, a vehicle controller includes one or more processors communicably coupled to a memory, the one or more processors configured to determine an expected entry or exit point for the passenger of the vehicle. The one or more processors may be configured to detect whether an obstacle or hazardous condition is present at or near a site. The one or more processors may be configured to determine, in response to detecting that the obstacle or hazardous condition is present at or near the site, a drop-off or pick-up location associated with the site based at least in part on a position of the expected entry or exit point for the passenger of the vehicle and the detected obstacle or hazardous condition.

30 Claims, 16 Drawing Sheets

(51) Int. Cl.
  *G06Q 10/02*     (2012.01)
  *G06Q 10/0631*   (2023.01)
  *G06Q 50/26*     (2024.01)
  *G06Q 50/40*     (2024.01)
(52) U.S. Cl.
  CPC ..... *G06Q 10/06315* (2013.01); *G06Q 50/265* (2013.01); *G06Q 50/40* (2024.01)
(58) Field of Classification Search
  USPC .............................................. 701/2
  See application file for complete search history.

(56) References Cited

U.S. PATENT DOCUMENTS

| | | | |
|---|---|---|---|
| 10,545,023 B1* | 1/2020 | Herbach | G08G 1/096833 |
| 2017/0169535 A1* | 6/2017 | Tolkin | G06Q 50/30 |
| 2018/0039917 A1* | 2/2018 | Buttolo | G06Q 10/109 |
| 2018/0136656 A1 | 5/2018 | Rasmusson, Jr. et al. | |
| 2019/0047584 A1 | 2/2019 | Donnelly | |
| 2019/0163204 A1* | 5/2019 | Bai | G05D 1/0278 |
| 2019/0172170 A1* | 6/2019 | Jabour | G06Q 10/02 |
| 2019/0271552 A1* | 9/2019 | Choi | G01C 21/3438 |
| 2019/0295413 A1 | 9/2019 | Hase et al. | |
| 2019/0311307 A1* | 10/2019 | Ramot | G01C 21/3438 |
| 2019/0371171 A1* | 12/2019 | Sholingar | G08G 1/096725 |
| 2020/0089973 A1 | 3/2020 | Efland | |
| 2021/0380135 A1* | 12/2021 | Kanitz | G01C 21/3461 |

FOREIGN PATENT DOCUMENTS

| | | | |
|---|---|---|---|
| WO | WO-2019023324 A1 | | 1/2019 |
| WO | WO-2020001846 A1 * | | 1/2020 |

OTHER PUBLICATIONS

Translation of JP-2019212118-A.*
Bayless S., "Driverless Cars and Accessibility", ITS America, Apr. 2019, 43 Pages.
International Search Report and Written Opinion—PCT/US2021/062124—ISA/EPO—Apr. 13, 2022.

* cited by examiner

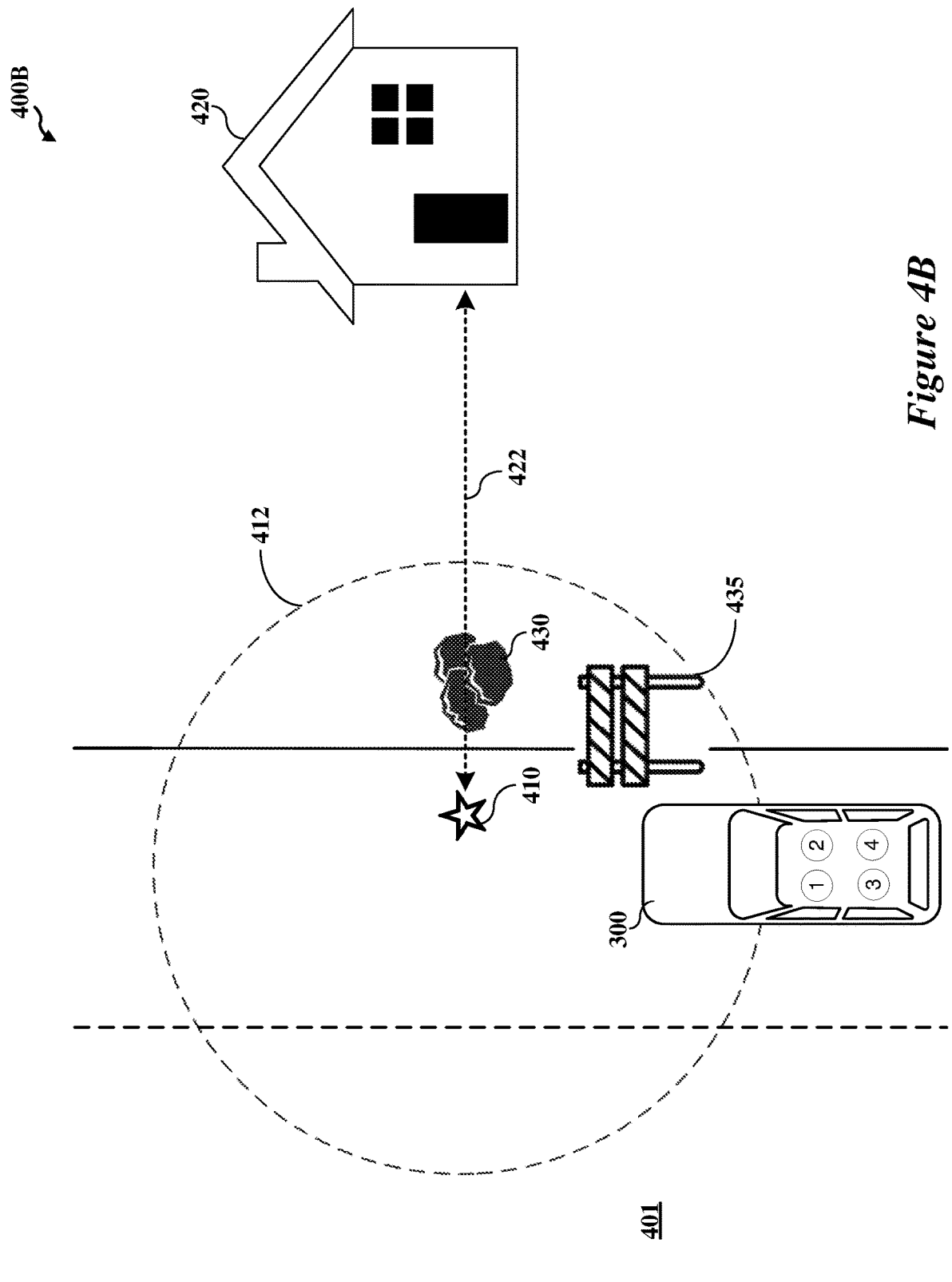

DETERMINING DROP-OFF OR PICK-UP LOCATIONS FOR PASSENGERS OF VEHICLES

TECHNICAL FIELD

This disclosure relates generally to vehicles configured for passenger service and, more specifically, to determining drop-off or pick-up locations for passengers of vehicles.

DESCRIPTION OF THE RELATED TECHNOLOGY

Autonomous vehicles (AVs) and semi-autonomous vehicles can operate in a substantially autonomous mode in which the vehicle navigates through an environment with little or no input from a human driver. Autonomous vehicles may also be dispatched to pick up and/or drop off passengers at various drop-off or pick-up locations, which typically include designated parking areas for parking, picking up passengers, and dropping off passengers.

When vehicles such as autonomous vehicles stop or park for passenger drop offs and/or pickups at a location, obstacles, and hazardous conditions at or near the drop-off or pick-up location may impede a passenger's ability to enter and/or exit the vehicle. Thus, although able to self-navigate to a specified passenger drop-off and/or pick-up location, conventional autonomous vehicles may not be able to determine precisely where to park, for example, such that nearby obstacles or hazardous conditions do not impede or otherwise affect the passenger's ability to safely and comfortably enter and/or exit the autonomous vehicle.

SUMMARY

The systems, methods, and devices of this disclosure may be used by vehicles configured for passenger service to determine drop-off and/or pick-up locations for passengers. In various implementations, an apparatus associated with a vehicle includes a memory communicably coupled to one or more processors. In some implementations, the one or more processors may be configured to determine an expected entry or exit point for a passenger of the vehicle. The one or more processors may be configured to detect whether an obstacle or hazardous condition is present at or near a site. The one or more processors may be configured to determine a drop-off or pick-up location associated with the site based at least in part on a position of the expected entry or exit point for the passenger of the vehicle and the detected obstacle or hazardous condition in response to detecting that the obstacle or hazardous condition is present at or near the site.

In various implementations, the detected obstacle or hazardous condition may include a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.

In some implementations, determining the drop-off or pick-up location may be based on a seating position of the passenger. In some instances, the drop-off or pick-up location may be determined based on whether the expected entry or exit point for the passenger of the vehicle and the detected obstacle or hazardous condition are on a same side of the vehicle. In some aspects, the different alternate drop-off or pick-up locations may be based on map data, coherent light sensing system data (e.g., LIDAR sensor data), images of the surrounding area, video of the surrounding area, RADAR, passenger input, or any combination thereof. In other aspects, the alternate drop-off or pick-up location may be determined from a plurality of different alternate drop-off or pick-up locations within a distance of the determined drop-off or pick-up location.

In some implementations, determination of the alternate drop-off or pick-up locations may be based at least in part on a physical limitation of the passenger, an age of the passenger, a presence of infants or children with the passenger, or any combination thereof. In other implementations, determination of the alternate drop-off or pick-up location may be based on one or more preferred drop-off or pick-up locations.

In one implementation, the one or more processors may be configured to receive an indication of a willingness of the passenger to ignore the detected obstacle or hazardous condition. The one or more processors may be configured to maintain the determined drop-off or pick-up location in response to receiving the indication of the passenger's willingness to ignore the detected obstacle or hazardous condition.

In some implementations, the one or more processors may also be configured to determine a seating position of the passenger in the vehicle. The one or more processors may also be configured to determine one or more alternate drop-off locations based on the seating position of the passenger relative to the expected entry or exit point for the passenger of the vehicle. In some instances, the one or more processors may also be configured to determine an alternate drop-off location for the passenger based at least in part on determining that the seating position of the passenger and the expected entry or exit point are on a same side of the vehicle.

In various implementations, a method for controlling one or more operations of a vehicle is disclosed. In some implementations, the method may be performed by an apparatus. In some aspects, the apparatus may be a vehicle controller associated with the vehicle. In other aspects, the apparatus may be the vehicle (or at least a part of the vehicle). In one implementation, the method includes determining an expected entry or exit point for a passenger of the vehicle. The method includes detecting whether an obstacle or hazardous condition is present at or near a site. The method includes determining, in response to detecting that the obstacle or hazardous condition is present at or near the site, a drop-off or pick-up location associated with the site based at least in part on a position of the expected entry or exit point for the passenger of the vehicle and the detected obstacle or hazardous condition.

In various implementations, the detected obstacle or hazardous condition may include a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.

In some implementations, determining the drop-off or pick-up location may be based on a seating position of the passenger. In some instances, the drop-off or pick-up location may be determined based on whether the expected entry or exit point for the passenger of the vehicle and the detected obstacle or hazardous condition are on a same side of the vehicle. In some aspects, the different alternate drop-off or pick-up locations may be based on map data, coherent light sensing system data (e.g., LIDAR sensor data), images of the surrounding area, video of the surrounding area, RADAR, passenger input, or any combination thereof. In other aspects, the alternate drop-off or pick-up location may be determined from a plurality of different alternate drop-off or pick-up locations within a distance of the determined drop-off or pick-up location.

In some implementations, determination of the alternate drop-off or pick-up locations may be based at least in part on a physical limitation of the passenger, an age of the passenger, a presence of infants or children with the passenger, or any combination thereof. In other implementations, determination of the alternate drop-off or pick-up location may be based on one or more preferred drop-off or pick-up locations.

In one implementation, the method may also include receiving an indication of a willingness of the passenger to ignore the detected obstacle or hazardous condition. The method may also include maintaining the determined drop-off or pick-up location in response to receiving the indication of the passenger's willingness to ignore the detected obstacle or hazardous condition.

In various implementations, the method may also include determining a seating position of the passenger in the vehicle. The method may also include determining one or more alternate drop-off locations based on the seating position of the passenger relative to the expected entry or exit point for the passenger of the vehicle. In some instances, the method may also include determining an alternate drop-off location for the passenger based at least in part on determining that the seating position of the passenger and the expected entry or exit point are on a same side of the vehicle.

In various implementations, a system is disclosed. In some implementations, the system may include means for determining an expected entry or exit point for a passenger of a vehicle. The system may include means for detecting whether an obstacle or hazardous condition is present at or near a site. The system may include means for determining, in response to detecting that the obstacle or hazardous condition is present at or near the site, a drop-off or pick-up location associated with the site based at least in part on a position of the expected entry or exit point for the passenger of the vehicle and the detected obstacle or hazardous condition.

In various implementations, the detected obstacle or hazardous condition may include a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.

In some implementations, determining the drop-off or pick-up location may be based on a seating position of the passenger. In some instances, the drop-off or pick-up location may be determined based on whether the expected entry or exit point for the passenger of the vehicle and the detected obstacle or hazardous condition are on a same side of the vehicle. In some aspects, the different alternate drop-off or pick-up locations may be based on map data, coherent light sensing system data (e.g., LIDAR sensor data), images of the surrounding area, video of the surrounding area, RADAR, passenger input, or any combination thereof. In other aspects, the alternate drop-off or pick-up location may be determined from a plurality of different alternate drop-off or pick-up locations within a distance of the determined drop-off or pick-up location.

In some implementations, determination of the alternate drop-off or pick-up locations may be based at least in part on a physical limitation of the passenger, an age of the passenger, a presence of infants or children with the passenger, or any combination thereof. In other implementations, determination of the alternate drop-off or pick-up location may be based on one or more preferred drop-off or pick-up locations.

In one implementation, the system may also include means for receiving an indication of a willingness of the passenger to ignore the detected obstacle or hazardous condition. The system may also include means for maintaining the determined drop-off or pick-up location in response to receiving the indication of the passenger's willingness to ignore the detected obstacle or hazardous condition.

In various implementations, the system may also include means for determining a seating position of the passenger in the vehicle. The system may also include means for determining one or more alternate drop-off locations based on the seating position of the passenger relative to the expected entry or exit point for the passenger of the vehicle. In some instances, the system may also include means for determining an alternate drop-off location for the passenger based at least in part on determining that the seating position of the passenger and the expected entry or exit point are on a same side of the vehicle.

In various implementations, a non-transitory computer-readable medium storing instructions for controlling a vehicle is disclosed. In some implementations, execution of the instructions by one or more processors of an apparatus causes the vehicle to perform operations. In one implementation, the operations may include determining an expected entry or exit point for a passenger of the vehicle. The operations may include detecting whether an obstacle or hazardous condition is present at or near a site. The operations may include determining, in response to detecting that the obstacle or hazardous condition is present at or near the site, a drop-off or pick-up location associated with the site based at least in part on a position of the expected entry or exit point for the passenger of the vehicle and the detected obstacle or hazardous condition. In some aspects, the apparatus may be a vehicle controller associated with the vehicle. In other aspects, the apparatus may be the vehicle (or at least a part of the vehicle).

In various implementations, the detected obstacle or hazardous condition may include a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.

In some implementations, determining the drop-off or pick-up location may be based on a seating position of the passenger. In some instances, the drop-off or pick-up location may be determined based on whether the expected entry or exit point for the passenger of the vehicle and the detected obstacle or hazardous condition are on a same side of the vehicle. In some aspects, the different alternate drop-off or pick-up locations may be based on map data, coherent light sensing system data (e.g., LIDAR sensor data), images of the surrounding area, video of the surrounding area, RADAR, passenger input, or any combination thereof. In other aspects, the alternate drop-off or pick-up location may be determined from a plurality of different alternate drop-off or pick-up locations within a distance of the determined drop-off or pick-up location.

In some implementations, determination of the alternate drop-off or pick-up locations may be based at least in part on a physical limitation of the passenger, an age of the passenger, a presence of infants or children with the passenger, or any combination thereof. In other implementations, determination of the alternate drop-off or pick-up location may be based on one or more preferred drop-off or pick-up locations.

In one implementation, the operations may include receiving an indication of a willingness of the passenger to ignore the detected obstacle or hazardous condition. The operations may include maintaining the determined drop-off or pick-up location in response to receiving the indication of the passenger's willingness to ignore the detected obstacle or hazardous condition.

In various implementations, the operations may include determining a seating position of the passenger in the vehicle. The operations may include determining one or more alternate drop-off locations based on the seating position of the passenger relative to the expected entry or exit point for the passenger of the vehicle. In some instances, the operations may also include determining an alternate drop-off location for the passenger based at least in part on determining that the seating position of the passenger and the expected entry or exit point are on a same side of the vehicle.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 4A-4C show illustrations depicting a vehicle modifying a drop-off or pick-up location, according to some implementations.

Like reference numbers and designations in the various drawings indicate like elements.

DETAILED DESCRIPTION

Figure 1:
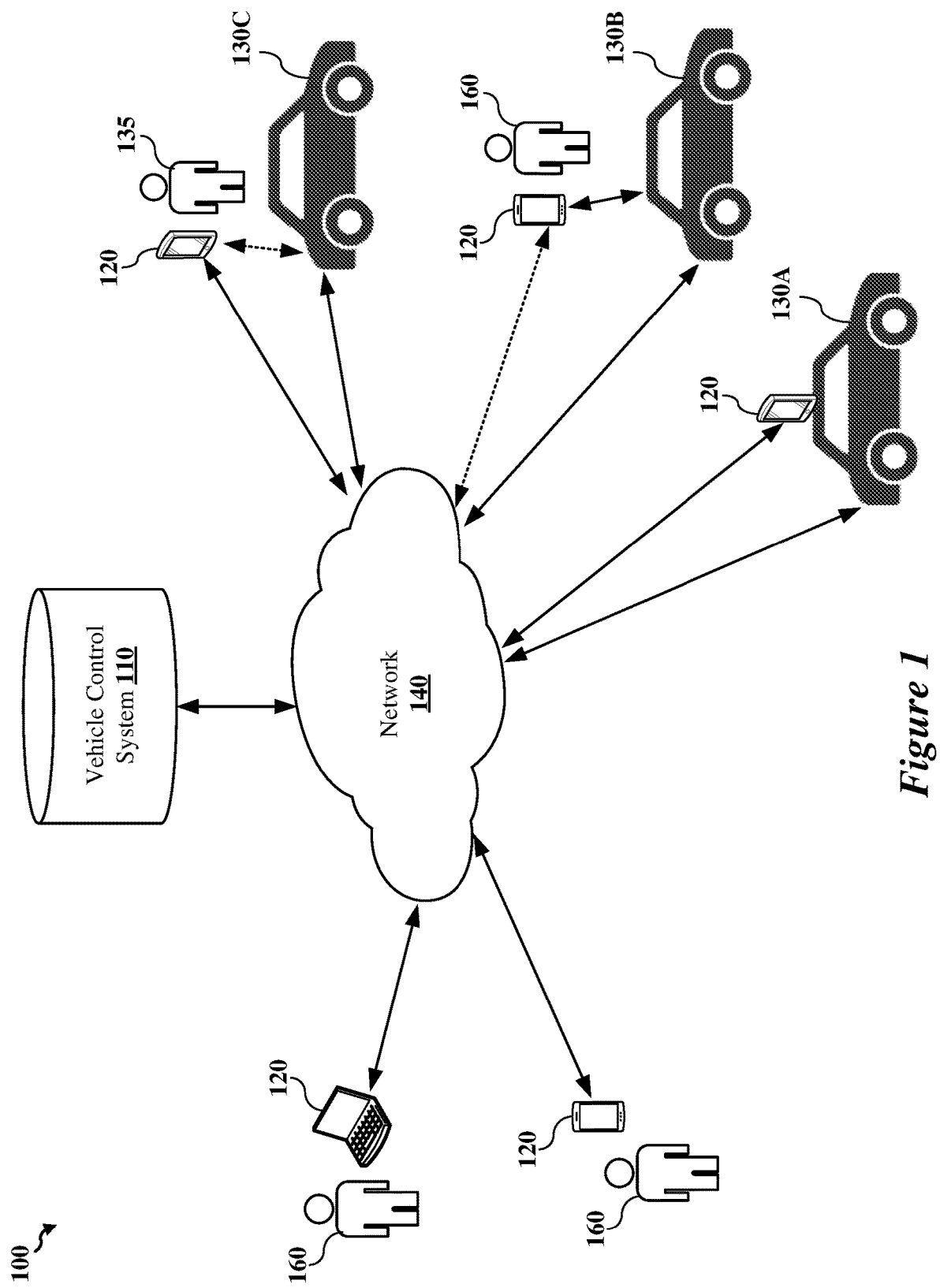
FIG. 1 shows a pictorial diagram of an example system.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action. Thus, although described herein with respect to autonomous or semi-autonomous vehicles (also known as self-driving cars or "SDCs"), aspects of the present disclosure may be implemented within other vehicles such as (but not limited to) cars, trucks, motorcycles, buses, boats, helicopters, robots, unmanned aerial vehicles, recreational vehicles, amusement park vehicles, construction equipment, and golf carts.

Vehicles may be configured to operate in an autonomous or semi-autonomous mode and navigate through an environment with little or no input from a driver while in this mode. These autonomous and semi-autonomous vehicles typically include a number of sensors configured to determine information about the environment in which the vehicle operates. The sensors may include one or more light detection and ranging (LIDAR) devices that can detect multiple objects (such as other vehicles, pedestrians, traffic signals, obstacles, and so on) in the environment and determine distances between the autonomous vehicle and the multiple objects. Autonomous and semi-autonomous vehicles may also include other types of sensors including, for example (but not limited to), sonar devices, radar devices, cameras, and audio sensing devices. Data from the LIDAR and/or other types of sensors can be used to determine various features and characteristics of the detected objects (such as the position, size, shape, type, movement, orientation of the object, etc.).

Some autonomous vehicles can be used or configured for passenger service and/or cargo service (e.g., delivery service). For example, a user may provide a pickup location and/or a drop-off location to a passenger dispatching service, which can relay the passenger pick-up and drop-off locations to an autonomous vehicle. The user may indicate or specify the drop-off and pick-up locations in various ways including (but not limited to), for example, by using the current location of the user's client device, by using a recent or saved location associated with the user's profile, or by entering an address or tapping a location on a map presented on the client device. The client device may send the drop-off and/or pick-up locations to the passenger dispatching service, which in turn can arrange for an autonomous vehicle to pick-up the passenger and transport the passenger to the specified drop-off location.

However, not all locations may be suitable, safe, or viable as passenger (or cargo) pick-up or drop-off locations. For example, obstacles and hazardous conditions such as potholes, uneven pavement, construction barriers, and other vehicles can hinder the ability with which the autonomous vehicle can safely pick-up and drop-off passengers. In accordance with some aspects of the present disclosure, systems, methods, and devices are disclosed that may allow autonomous vehicles providing passenger (or cargo) service to selectively modify scheduled drop-off or pick-up locations based on a presence of obstacles or hazardous conditions at or near the scheduled drop-off or pick-up locations, one or more conditions of the autonomous vehicle's passengers (and/or cargo), the relative positions of the passengers being transported by the autonomous vehicle, or any combination thereof.

Various implementations relate generally to vehicles determining suitable pick-up and/or drop-off locations for passengers. Some implementations relate more specifically to determining passenger pick-up and/or drop-off locations that are free of obstacles, hazardous conditions, and other conditions that could cause injury to a respective passenger, that could impede the ability of the respective passenger to enter or exit the vehicle, or that could otherwise inconvenience the respective passenger. In one example implementation, an apparatus such as (but not limited to) a vehicle controller may be used to assist or control a vehicle configured for passenger service. In some aspects, the apparatus may determine an expected entry or exit point for a passenger of the vehicle. The apparatus may detect whether an obstacle or hazardous condition is present at or near a site. The apparatus may determine, in response to detecting that the obstacle or hazardous condition is present at or near the site, a drop-off or pick-up location associated with the site based at least in part on a position of the expected entry or exit point for the passenger of the vehicle and the detected obstacle or hazardous condition.

In some implementations, the apparatus may detect obstacles and hazardous conditions within an area or zone of an identified drop-off or pick-up location. In some instances, the area or zone of an identified drop-off or pick-up location may include portions of the surrounding environment that are within a certain distance (such as approximately between 15 and 50 feet or another range) of the identified drop-off or pick-up location. In other instances, the area or zone of an identified drop-off or pick-up location may include portions of the surrounding environment that are within a certain distance (such as approximately between 15 and 50 feet or another range) of the vehicle while at the identified drop-off or pick-up location.

In various implementations, determining the drop-off or pick-up location may also be based on the seating position of a passenger relative to the expected entry or exit point for the passenger of the vehicle. For example, when a detected obstacle or hazardous condition is on the same side of the vehicle as the expected exit point for a respective passenger and is likely to prevent or impede one or more passengers from entering or exiting the vehicle, the apparatus may determine an alternate drop-off or pick-up location such that the detected obstacle or hazardous condition does not prevent, impede, or render unsafe the respective passenger's path when exiting the vehicle. Conversely, when the detected obstacle or hazardous condition is on a different side of the vehicle as the expected exit point for the respective passenger, the vehicle may stop and drop off the respective passenger at the original or scheduled drop-off location, for example, when the detected obstacle or hazardous condition is not likely to prevent or impede passengers from entering or exiting the vehicle.

As used herein, an alternate drop-off or pick-up location is a location that is different than an originally scheduled drop-off or pick-up location but yet sufficiently close to the originally scheduled drop-off or pick-up location such that both the originally scheduled drop-off or pick-up location and the alternate drop-off or pick-up location are associated with the same destination. That is, when the vehicle determines to find a viable alternate drop-off or pick-up location (e.g., due to a presence of obstacles or hazardous conditions at the originally scheduled drop-off or pick-up location), the vehicle does not change the passenger's destination. Instead, the vehicle drops off or picks up passengers within a certain distance (e.g., a 5-minute walk, within 1-2 blocks, etc.) of the originally scheduled drop-off or pick-up location. The certain distance is generally a relatively short distance (e.g., a walk of a few minutes, within 1-2 blocks, etc.) that a passenger will feel comfortable walking from the alternate location to the destination rather than from the original location (or walking from the destination to the alternate location rather than to the original location).

Of course, what is comfortable may vary among passengers/users, circumstances, and/or their requirements (e.g., carrying luggage or an infant). In some implementations, the certain distance may be configured by the passenger (e.g., in vehicle, on a mobile device, etc.) or other party. In some instances, the certain distance may be adjusted (e.g., automatically or in response to a user/passenger confirmation) based on various circumstances. For example, if rain is detected, the certain distance may be reduced (e.g., by half or another amount). Similarly, if the temperature and/or humidity (or other weather condition(s)) exceed or are below some threshold, the certain distance may be reduced accordingly. As another example, if the passenger is late (e.g., as determined by a calendar appointment in the passenger's device, profile, etc.), the certain distance may be reduced to save time. As yet another example, if the passenger's daily step count (or other health metric, such as calories burned) is low, the certain distance may be increased.

In various implementations, the vehicle may detect one or more conditions of a passenger (either a current passenger or a would-be passenger that is to be picked up). The vehicle may determine the drop-off or pick-up location for the passenger based on whether the passenger requires additional time and/or space to enter or exit the vehicle, for example, in view of the passenger's conditions. In some instances, the conditions of a respective passenger may include (but are not limited to) a physical handicap or limitation of the respective passenger, a presence of infants or children with the respective passenger, an age of the passenger, a presence of a relatively large amount of luggage, cargo, or equipment with the respective passenger, or any combination thereof. However, any condition or requirement of a passenger that may result in the passenger needing additional time or space to enter or exit the vehicle may be used when determining a drop-off or pick-up location for the passenger.

In some instances, one or more attributes of the scheduled drop-off or pick-up location may be considered when determining one or more alternate drop-off or pick-up locations. The one or more attributes may include (but are not limited to) at least one of a water puddle, an ice patch, a pothole, uneven pavement, high curbs, storm drains, garbage, construction barriers, other vehicles, obstructions (e.g., fire hydrants, walls, trees, etc.), weather conditions, a fire line, a no parking zone, a closed lane within a vicinity of the identified drop-off or pick-up location, less than a certain amount of room in front of or behind the vehicle, or any combination thereof. For example, when the vehicle determines that a respective passenger needs additional space to exit the vehicle (such as because the passenger has a large number of suitcases in the trunk and is traveling with infants), the vehicle may select an alternate drop-off location that provides additional space to the side of the vehicle for unloading the infants, provides additional space behind the vehicle for unloading the suitcases, provides additional time associated with tending to the infants, or any combination thereof. Conversely, when the vehicle does not determine that the respective passenger requires additional time or space, the vehicle may continue to the scheduled drop-off location.

In some instances, the passengers may indicate to the vehicle (directly or indirectly through an intermediary, such as the passenger dispatch service, etc.) whether they need additional time and/or space to enter or exit the vehicle during passenger pick-ups and drop-offs, respectively. In further implementations, the passenger(s) may indicate approximately how much time (e.g., 5 minutes) and/or space they require (e.g., 10 feet of clearance behind vehicle). As such, this indication may be used by the vehicle to modify the drop-off or pick-up location. In some implementations, the passenger(s) may provide detail(s) or other information that may affect their additional time and/or space requirements (e.g., traveling with an infant and car seat; traveling with several suitcases; etc.). Accordingly, these details may be used by the vehicle to modify the drop-off or pick-up location. For instance, the vehicle may modify the drop-off or pick-up location to accommodate the details.

In some implementations, the vehicle may present a number of alternate drop-off locations on a display screen (e.g., a display screen within the vehicle, etc.) viewable by passengers riding in the vehicle. A respective passenger may select one of the alternate drop-off locations presented on the display screen. The vehicle may drive to and drop off the respective passenger at the alternate drop-off location selected by the respective passenger. In some instances, the alternate drop-off locations may be presented on a display screen associated with the vehicle. In addition, or in the alternative, the alternate drop-off locations or alternate pick-up locations may be shared with one or more passengers' mobile computing device(s), which may present the alternate drop-off or pick-up locations on their displays (such as touch-sensitive display screens) for viewing and interactions with the respective passengers. For example, the alternate drop-off or pick-up locations may be presented as selectable icons on the touch-sensitive display screen of a passenger's mobile computing device. The passenger may select a particular alternate drop-off or pick-up location by touching, tapping, or otherwise interacting with the selectable icon corresponding to the particular alternate drop-off or pick-up location.

Particular implementations of the subject matter described in this disclosure can be implemented to realize one or more of the following potential advantages. By allowing a vehicle (such as an autonomous vehicle) to determine passenger drop-off and/or pick-up locations based on a presence of obstacles or hazardous conditions at or near the drop-off and/or pick-up locations, aspects of the subject matter disclosed herein may ensure that passengers of such vehicles are not impeded or inconvenienced by obstacles or hazardous conditions when entering or exiting the vehicle. Also, the ability of vehicles implementing various techniques disclosed herein to dynamically determine one or more alternate drop-off and/or pick-up locations based on passenger preferences and/or needs may ensure that passengers needing additional time to enter or exit the vehicle, passengers needing additional space to enter or exit the vehicle, and/or passengers with certain physical attributes or limitations are picked up and dropped off at locations that accommodate these passengers. In this way, vehicles implementing various aspects of the subject matter disclosed herein may pick-up and drop-off passengers in a safer and more convenient manner than conventional vehicles.

Several aspects of vehicles such as autonomous vehicles that provide passenger and/or cargo services will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a pictorial diagram of an example system 100 within which various aspects of the subject matter disclosed herein may be implemented. The system 100 includes a vehicle control system 110, one or more client devices 120, vehicles 130A-130C, and a communications network 140. In some implementations, the example system 100 may include other numbers of client devices 120 and/or vehicles 130. In addition, or in the alternative, the example system 100 may include other components, devices, or systems not shown for simplicity.

The vehicle control system 110 may include any number of computing devices such as (but not limited to) servers that can be implemented in a single location or distributed across multiple locations. The servers may be of various types such as, for example, a web server, a news server, a file server, an application server, a database server, a proxy server, or any other server suitable for performing functions or processes described herein, or any combination thereof. Each server may be a unitary server or a distributed server spanning multiple computers or multiple datacenters, and may include hardware, software, or embedded logic components or a combination of two or more such components for carrying out the appropriate functionalities implemented or supported by the server.

The vehicle control system 110 may be used to assist vehicles 130A-130C (collectively referred to herein as the vehicles 130) operating in an autonomous mode and configured for providing passenger and/or cargo service to select, identify, or otherwise determine drop-off and/or pick-up locations for passengers. In some implementations, the vehicle control system 110 may determine passenger drop-off and/or pick-up locations that are free of obstacles and hazardous conditions. The vehicle control system 110 may also determine the passenger drop-off and/or pick-up locations based at least in part on one or more physical attributes of the passenger, a physical limitation of the passenger, an age of the passenger, a presence of infants or children with the passenger, or any combination thereof. In addition, or in the alternative, the vehicle control system 110 may also determine the passenger drop-off and/or pick-up locations based on whether the passenger requires additional time or space to enter or exit the autonomous vehicle.

In some implementations, the vehicle control system 110 may facilitate transportation for one or more passengers 160 in the vehicles 130. For example, the vehicle control system 110 may receive a service request from a passenger 160 (e.g., via the passenger's client device 120), along with an identifier of the requesting passenger 160. The passenger identifier may identify the passenger 160 to the vehicle control system 110, for example, to enable the vehicle control system 110 to retrieve (but not limited to) passenger preferences, payment methods, preferred pick-up or drop-off locations, or any other suitable information.

The client devices 120 may be any suitable computer or computing device capable of communicating with the vehicle control system 110, the vehicles 130, or other communication devices, nodes, or entities via the communications network 140. In some instances, the client devices 120 may be a desktop computer, a laptop computer, a personal digital assistant, a cellular telephone, a smartphone, a tablet computer, a game console, an electronic book reader, or another suitable communications device. Some client devices 120 may be associated with passengers 160 of the vehicles 130, while other client devices 120 may be associated with human drivers 135 of the vehicles 130. For example, in some instances, a passenger 160 may use client device 120 to request or schedule passenger service by one of the vehicles 130, and may use client device 120 to exchange information with the vehicle 130 during the requested or scheduled passenger service. In other instances, a human driver 135 may use client device 120 to communicate and exchange information with one or more passengers 160, and to communicate and exchange information with the vehicle control system 110 and vehicle 130. In some other instances, one or more of the vehicles 130 may include or may be associated with one of the client devices 120.

The vehicles 130 may be any suitable type of autonomous vehicle or semi-autonomous vehicle that can be used for providing passenger and/or cargo service while in an autonomous mode. Although not shown in FIG. 1 for simplicity, the vehicles 130 may include an autonomous vehicle controller, communications circuitry, a user interface, and other components typically included in vehicles that can operate in an autonomous (or semi-autonomous) driving mode while providing passenger service. In some implementations, the vehicle controller provided within or associated with a vehicle 130 may perform some or all the operations described with reference to the vehicle control system 110.

The communications network 140 provides communication links between the vehicle control system 110, the client devices 120, and the vehicles 130. The network 140 may be any suitable one or more communication networks including, for example, one or more of the Internet, a wide area network (WAN), a metropolitan area network (MAN), a wireless local area network (WLAN), a personal area network (PAN) such as Bluetooth®, a radio access network (RAN) such as a Fifth Generation (5G) New Radio (NR) system, a wired network, a cable network, a satellite networks or other suitable network.

Figure 2:
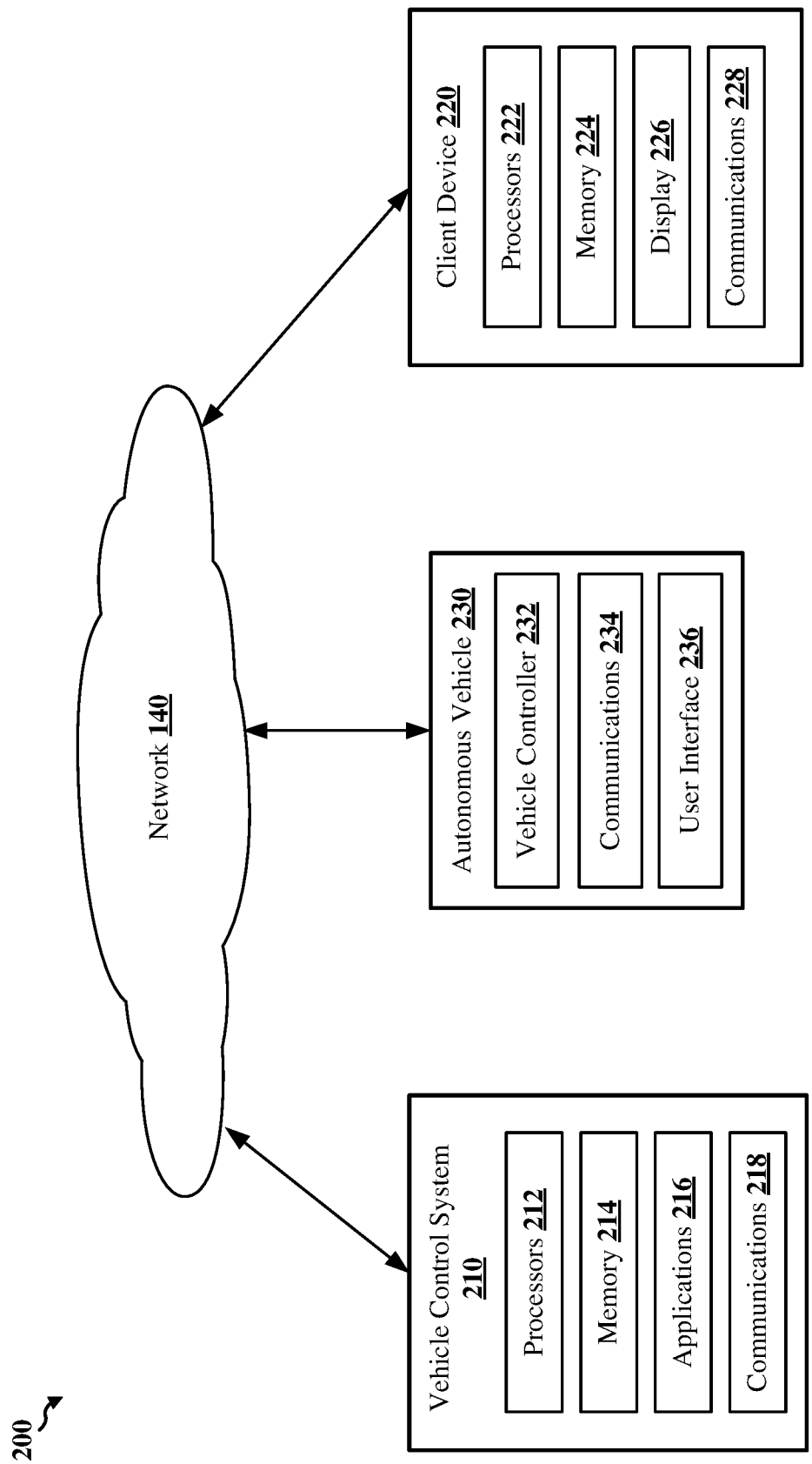
FIG. 2 shows a functional block diagram of the example system of FIG. 1.

FIG. 2 shows a functional block diagram of an example system 200 according to some implementations. The system 200, which may be an example of the system 100 of FIG. 1, is shown to include a vehicle control system 210, a client device 220, an autonomous vehicle 230, and the communications network 140 of FIG. 1. The vehicle control system 210, which may be an example of the vehicle control system 110 of FIG. 1, is shown to include one or more processors 212, a memory 214, one or more applications 216, and communications circuitry 218. The processors 212 may be or may include any number of commercially available microprocessors or central processing units (CPUs) capable of executing scripts or instructions of one or more software programs stored in associated memory. In addition, or in the alternative, the processors 212 may be or may include any number of Application Specific Integrated Circuits (ASICs), Field Programmable Gate Arrays (FPGAs), or Programmable Logic Devices (PLDs).

The memory 214 may include a non-transitory computer-readable medium (such as one or more nonvolatile memory elements, such as EPROM, EEPROM, Flash memory, a hard drive, etc.) storing instructions that, when executed by the one or more processors 212, cause the vehicle control system 210 to perform at least some of the operations described with reference to one or more of FIGS. 6A-6B, 7A-7B, 8A-8B, 9, 10, 11, 12, 13, 14, 15, 16, and 17. In some instances, the memory 214 may store applications 216 that can be executed by the one or more processors 212 to perform certain functions. For example, a vehicle controller application residing within memory of the vehicle control system 210 may be executed to communicate with and control various operations of the autonomous vehicle 230. In some instances, the vehicle controller application may be used to assist or operate the autonomous vehicle 230 when selecting a drop-off or pick-up location for passengers and/or cargo, for instance, when modifying the selected drop-off or pick-up location based on one or more of detected obstacles or hazardous conditions, physical limitations of a particular passenger, or passengers requiring additional time and/or space to enter or exit the autonomous vehicle, and when selecting an alternate drop-off or pick-up location.

The communications circuitry 218 may be used to establish and maintain communications links between the vehicle control system 210, the client device 220, and the autonomous vehicle 230 via the communications network 140. The communications circuitry 218 may use any suitable communications protocol including, for example, wireless communications protocols specified by one or more Releases of the Third Generation Partnership Project (3GPP), by one or more amendments to the IEEE 802.11 family of standards, the Bluetooth Interest Group, or other suitable communications technology.

The client device 220, which may be one example of the client devices 120 of FIG. 1, is shown to include one or more processors 222, a memory 224, a display screen 226, and communications circuitry 228. The processors 222 may be or may include any number of commercially available microprocessors or central processing units (CPUs) capable of executing scripts or instructions of one or more software programs stored in associated memory. In addition, or in the alternative, the processors 212 may be or may include any number of ASICs, FPGAs, or PLDs. The memory 224 may include a non-transitory computer-readable medium (such as one or more nonvolatile memory elements, such as EPROM, EEPROM, Flash memory, a hard drive, etc.) storing instructions that, when executed by the one or more processors 222, cause the client device 220 to perform at least some of the operations described herein. The display screen 226 may be any suitable display screen that can receive input from the user and present output to the user. The communications circuitry 228 may be used to establish and maintain communications links between the client device 220, the vehicle control system 210, and the autonomous vehicles 230 via the communications network 140. The communications circuitry 228 may use any suitable communications protocol including, wireless communications protocols specified by one or more Releases of the 3GPP, by one or more amendments to the IEEE 802.11 family of standards, the Bluetooth Interest Group, or other suitable communications technology.

The client device 220 may be used by passengers, by human co-drivers of autonomous vehicles, or may be provided within an autonomous vehicle. For example, a passenger may use the client device 120 to request passenger service by an autonomous vehicle, to update drop-off or pick-up locations, to pay for rides, and other functions. A human co-driver may use the client device 120 to communicate with one or more passengers, the vehicle control system 210, and other autonomous vehicles. An autonomous vehicle may use the client device 120 to communicate with passengers, with the vehicle control system 210, and with other autonomous vehicles.

The autonomous vehicle 230, which may be an example of the vehicles 130 of FIG. 1, may be any suitable type of vehicle capable of providing passenger services while operating in an autonomous mode or semi-autonomous mode. The autonomous vehicle 230 may include a vehicle controller 232, communications circuitry 234, and a user interface 236. The vehicle controller 232 may be used to control various operations of the autonomous vehicle 300 relating to providing a passenger service. For example, the vehicle controller 232 may control operations for picking up passengers at specified pick-up locations, dropping off passengers at specified drop-off locations, modifying the specified pick-up or drop-off locations based on detected obstacles or hazardous conditions, physical limitations of passengers, indications that certain passengers need additional time or space to enter or exit the autonomous vehicle, among other factors or conditions. The communications circuitry 234 may be used to establish and maintain communications links between the vehicle control system 210, the client device 220, and the autonomous vehicle 230 via the communications network 140. The user interface 236 may be used to present information to the passengers. The user interface 236 may be used to receive user input (such as commands and preferences) from the passengers.

Figure 3:
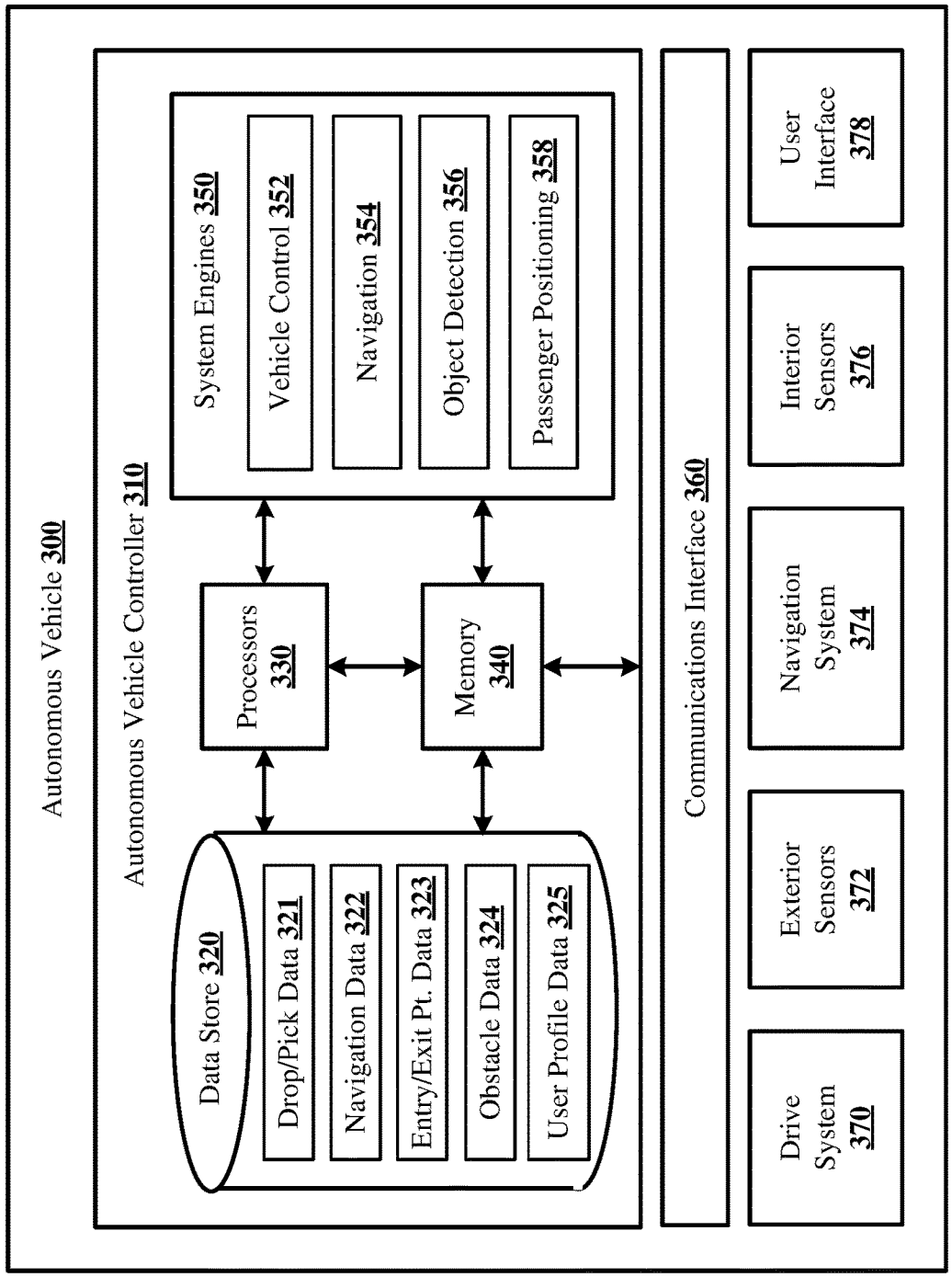
FIG. 3 shows a block diagram of an autonomous vehicle in accordance with some aspects of the present disclosure.

FIG. 3 shows a block diagram of an autonomous vehicle 300 (which may correspond to the autonomous vehicles 130, 230 of FIGS. 1 and 2) according to some implementations. The autonomous vehicle 300 may be any type of vehicle, including (but not limited to) cars, trucks, vans, buses, street cars, trains, subways, aircrafts, boats, and so on, regardless of how powered or driven. In some implementations, the autonomous vehicle 300 may include an autonomous vehicle controller 310, a communications interface 360, a drive system 370, exterior sensors 372, a navigation system 374, interior sensors 376, and a user interface 378. The autonomous vehicle 300 may include other components not shown in the example of FIG. 3.

The vehicle controller 310, which may be one example of the vehicle controller 232 of FIG. 2, can be used to determine drop-off or pick-up locations for passengers transported by the autonomous vehicle 300. The vehicle controller 310 may be implemented using any analog, digital, or mixed signal processing circuitry to control various operations of the autonomous vehicle 300. In some instances, the vehicle controller 310 can interface with and/or control operations of the drive system 370, exterior sensors 372, navigation system 374, interior sensors 376, and the user interface 378 of the autonomous vehicle 300. For example, the vehicle controller 310 may be integrated with the drive system 370 in a manner that allows the vehicle controller 310 to assume control of various driving and maneuvering operations of the autonomous vehicle 300 when picking up or dropping off passengers at various pick-up or drop-off locations.

The communications interface 360 may be used to establish and maintain communications links between a vehicle control system (such as the vehicle control system 110 of FIG. 1 or the vehicle control system 210 of FIG. 2), one or more mobile computing devices (such as the client devices 120 of FIG. 1 or the client device 220 of FIG. 2), and the autonomous vehicle 300. The communications interface 360 may use any suitable communications protocol including, for example, wireless communications protocols specified by one or more Releases of the 3GPP, by one or more amendments to the IEEE 802.11 family of standards, the Bluetooth Interest Group, or other suitable communications technology.

The drive system 370 may include a powertrain and various associated electrical, mechanical, electromechanical, control, and diagnostic systems of the autonomous vehicle 300. In some instances, the drive system 370 may include one or more engines, motors, transmissions, steering, braking, and other systems to control driving and parking operations of the autonomous vehicle 300.

The exterior sensors 372 may include any suitable sensors or devices that can be used, individually or in conjunction with one another, to scan the surrounding scene for objects, environmental features, roads, route features, other vehicles, traffic lights, weather conditions, obstacles, hazardous conditions, and other attributes, characteristics, or properties of the surrounding scene.

The exterior sensors 372 may include optical cameras, image sensors, video cameras, a coherent light sensing system, a RADAR system, or other suitable devices or sensors that can be used to detect and/or recognize objects in a surrounding environment. In various implementations, the coherent light sensing system and the RADAR system may be used to detect a presence of objects in the surrounding environment, to determine distances between the objects and the vehicle 120, to determine movement of the detected objects relative to the vehicle 120, and to determine other features and attributes of the surrounding environment. In some aspects, the RADAR system can include one or more radio frequency (RF) sensors and one or more millimeter wave (mmW) frequency sensors. In some aspects, the coherent light sensing system can include one or more LIDAR sensors and one or more infrared (IR) sensors. In some implementations, measurements provided by RF sensors, mmW frequency sensors, SONAR sensors, LIDAR sensors, and/or IR sensors can be used by a neural network to detect and classify objects in the surrounding environment. For example, in some aspects, the neural network may employ deep learning and inference techniques to recognize the detected objects (e.g., to recognize that a first detected object is another vehicle, that a second detected object is a stop sign, that a third detected object is a pedestrian, and so on).

In one implementation, the coherent light sensing system can emit or transmit light or infrared (IR) pulses into an environment and receive light or IR pulses reflected by objects and other surfaces in the environment to determine information about the objects and the other surfaces. In some implementations, the distance to a detected object may be determined based on a time between emission of a light or IR pulse by the coherent light sensing system and reception of a corresponding reflected light or IR pulse by the coherent light sensing system. The size, shape, orientation, texture, and other features of the detected object may be determined based (at least in part) on the amplitudes, pulse widths, timing information, and other characteristics of a multitude of such received light or IR pulses. Information generated from the received light or IR pulses may be used to generate a point cloud indicating the location, size, shape, movement, orientation, and other features of objects and other surfaces detected in the environment. The measured distances can be combined with orientations of the emitters to associate a three-dimensional position with each light or IR pulse received by the coherent light sensing system. The three-dimensional (3D) positions associated with a plurality of received light or IR pulses may be used to generate a 3D map of points indicative of locations of various objects and features in the environment. The autonomous vehicle 300 can use one or more of these 3D point clouds to navigate through the environment (such as along a route between drop-off or pick-up locations) without human input.

In some implementations, a first group of the exterior sensors 372 may be configured to detect and/or recognize obstacles, hazardous conditions, and other passenger impediments that are relatively close to a particular drop-off or pick-up location (such as located within a zone surrounding or associated with the particular drop-off or pick-up location). A second group of the exterior sensors 372 may be configured to scan relatively faraway areas of the scene to detect and/or recognize objects, environmental features, landmarks, buildings, roads, and other attributes of the scene that are relatively far from the particular drop-off or pick-up location (such as located outside the zone surrounding or associated with the particular drop-off or pick-up location). The zone may be of various sizes, shapes, or configurations based, for example, on attributes or characteristics of the particular drop-off or pick-up location, conditions of one or more passengers, passenger preferences, and other suitable factors. In this way, the first group of exterior sensors 372 can be configured for shorter-range scanning, while the second group of exterior sensors 372 can be configured for longer-range scanning.

In various implementations, scene mapping information provided by or derived from the first group of exterior sensors 372 can be fused, stitched, or otherwise combined with scene mapping information provided by or derived from the second group of exterior sensors 372 to generate a composite 3D point cloud of the entire scene. In this way, the composite 3D point cloud can indicate the presence of nearby obstacles and hazardous conditions relative to faraway objects, environment features, landmarks, buildings, roads, and other attributes of the scene. In some instances, the composite 3D point cloud may be updated with scene mapping information associated with the relatively faraway areas of the scene less frequently than with scene mapping information associated with the relatively close areas of the scene. For example, when the position or orientation of environmental features, objects, and other surfaces relatively far from the autonomous vehicle 300 remain constant (or have minimal changes) over a time period during which new obstacles or hazardous conditions are detected relatively close to a drop-off or pick-up location (or the autonomous vehicle 300), the autonomous vehicle 300 may update the composite 3D point cloud with nearby scene mapping information more frequently than with faraway scene mapping information. In other instances, the composite 3D point cloud may be updated with scene mapping information associated with the relatively faraway areas of the scene more frequently than with the scene mapping information associated with the relatively close areas of the scene. In some other instances, the composite 3D point cloud may be updated with all scene mapping information at the same or similar times.

The navigation system 374 may be provided in any suitable location on or within the autonomous vehicle 300. The navigation system 374 can use map data and sensor data to guide the autonomous vehicle 300 to destinations without colliding into (or otherwise avoiding) other objects. The navigation system 374 may also use map data and sensor data to detect the presence of obstacles and hazardous conditions at or near a scheduled drop-off or pick-up location. In some implementations, the navigation system 374 can access or receive detailed map information (such as 3D point clouds) that includes information about roads, bridges, buildings, landmarks, elevations, construction zones, real-time traffic conditions, weather information, event information, and the like directly from one or more sources such as (but not limited to) governmental institutions, subscription-based services, user-generated map collections, crowd-sourced mapping information, mapping information provided by other devices, and so on (e.g., without an intermediary system or service). In other implementations, the navigation system 374 can access or receive detailed map information (such as 3D point clouds) from a server (or other intermediary system or service) that can, at least in some instances, aggregate the detailed map information. In some instances, the detailed map information can be provided by a network entity or server (such as the vehicle control system 210 of FIG. 2). In other instances, the detailed map information (or at least portions thereof) can be provided by one or more other devices via a suitable wireless channel (such as a V2V or V2X channel of a 5G RAN, a sidelink channel of a 5G RAN, an unlicensed frequency band, peer-to-peer (P2P) connections, or a dedicated short range communication (DSRC) channel of a wireless network). Example devices can include (but are not limited to) other vehicles, smartphones, cameras, or AR/VR headsets. In one example implementation, the navigation system 374 may use the map data and/or the sensor data to supplement the detailed map information (e.g., when the detailed map information is incomplete or does not cover an entirety of a particular region of interest).

In various implementations, the detailed map information can be used to determine whether a scheduled drop-off or pick-up location is viable for the passenger and/or the autonomous vehicle 300. The detailed map information can be used to detect a presence of obstacles or hazardous conditions at the scheduled drop-off or pick-up location. The detailed map information can also be used to identify viable alternate drop-off or pick-up locations for passengers of the autonomous vehicle 300. In particular implementations, this may be done before the autonomous vehicle 300 travels to or otherwise before arriving at or near the scheduled drop-off or pick-up location. In this way, the speed and efficiency with which the autonomous vehicle 300 can select the most convenient drop-off or pick-up locations, while considering various attributes of the drop-off or pick-up locations and any conditions that may be associated with the passengers, may be significantly greater than conventional techniques that rely upon exterior sensors of the autonomous vehicle to provide such mapping information (in which the autonomous vehicle would typically be within scanning range of the drop-off or pick-up location).

In some implementations, the detailed map information can be fused, stitched, or filtered by mapping information provided by or derived from the external sensors 372, either periodically or continuously (such as in real-time). In some instances, one or more portions of the detailed map information may be updated with mapping information available from the external sensors 374. For example, the autonomous vehicle 300 may determine that a particular drop-off location is viable for a passenger prior to pick-up using received detailed map information. The external sensors 372 may subsequently identify one or more obstacles as the autonomous vehicle 300 approaches the drop-off location. In this example, the detailed map information did not indicate any obstacles at or near the drop-off location, and thus the mapping information provided by the external sensors 372 is more current and more accurate. As such, the autonomous vehicle 300 may use the mapping information provided by the external sensors 372 to determine whether the drop-off location remains viable for the passenger.

In some implementations, the navigation system 374 can include one or more satellite positioning system (SPS) receivers that can receive and decode satellite signals associated with various global satellite services such as the Global Positioning System (GPS), the Global Navigation Satellite System (GLONASS), and Galileo, as well as various regional satellite services such as the Indian Regional Navigation Satellite System (IRNSS). The satellite signals can be used by the autonomous vehicle 300 for general navigation purposes including, for example, determining a route between a pick-up location and a drop-off location and then maneuvering the autonomous vehicle 300 safely from the pick-up location to the drop-off location along the determined route. In some instances, the autonomous vehicle 300 can also use the received satellite signals to determine or construct mapping information for pick-up and/or drop-off locations.

In various implementations, the autonomous vehicle 300 may be configured to determine seating positions of passengers (e.g., specific seat locations, relative to each other, etc.) and/or expected exit points for the passengers. In some implementations, the interior sensors 376 may include any suitable sensors or devices (such as, but not limited to, pressure sensors, motion sensors, light sensors, optical sensors, wireless transceivers, etc.) that can be used to determine the seating positions of passengers within the autonomous vehicle 300. The interior sensors 376 may be used to determine the positions of current passengers relative to each other. The interior sensors 376 may be used to determine the passenger(s)' estimated exit points (and/or their positions relative to the estimated exit points) from the autonomous vehicle 300. In some instances, pressure sensors provided within or near the seats of the autonomous vehicle 300 can be used to determine whether a particular seat is occupied by a passenger. In other instances, motion sensors distributed throughout an interior of the autonomous vehicle 300 can be used to determine whether passengers are entering the autonomous vehicle 300 or existing the autonomous vehicle 300. In some other instances, light sensors can be used to determine distances to each passenger in the autonomous vehicle 300.

In some implementations, the interior sensors 376 can include one or more transceivers positioned within the autonomous vehicle 300 and configured to exchange wireless signals with mobile computing devices associated with the passengers. The exchanged wireless signals can be used to determine the positions of the passengers relative to each other, relative to an expected entry point of the autonomous vehicle 300, and/or relative to an expected exit point of the autonomous vehicle 300. In some instances, a wireless transmitting device (such as but not limited to an access point (AP), a softAP, a wireless station (STA), a user equipment (UE), or some other suitable wireless communication device) can transmit wireless signals to and receive wireless signals from the passengers' mobile computing devices. In some instances, the wireless transmitting device may be located in the dashboard. In some other instances, the wireless transmitting device may be provided in another suitable location of the vehicle 120.

In one example implementation, the wireless transmitting device may use RF sensing and/or ranging techniques to determine distances between the transmitting device and each of the passengers, to determine the relative locations of the passengers, and/or to determine movements of the passengers relative to one another. The RF ranging signals may include (but are not limited to) Wi-Fi signals, Ultra-Wide Band (UWB) signals, Bluetooth® signals, LTE communications, 5G NR communications, narrowband signals, P2P communications, and so on. In some aspects, RF sensing and/or ranging techniques can classify (e.g., recognize or identify) passengers of the vehicle.

The wireless transmitting device can also use information of the transmitted and received wireless signals to determine distances and/or angles between the wireless transmitting device and each passenger's mobile computing device. The distance information and/or angle information can be used to determine the location of each passenger's mobile computing device relative to the wireless transmitting device, and therefore also relative to one another, relative to expected entry points of the autonomous vehicle 300, and/or relative to expected exit points of the autonomous vehicle 300. The wireless transmitting device can use any suitable positioning technique including (but not limited to) Assisted GNSS (A-GNSS), Observed Time Difference of Arrival (OTDOA) (e.g., Downlink (DL) OTDOA or Uplink (UL) OTDOA), Real Time Kinematics (RTK), Precise Point Positioning (PPP), Differential GNSS (DGNSS), Enhanced Cell ID (E-CID), angle of arrival (AOA), angle of departure (AOD), and/or other positioning methods to determine the locations of the passengers in the autonomous vehicle 300.

The user interface 380 may be or may include any suitable devices or components through which the autonomous vehicle 300 can present questions, options, or other information to the passengers, and/or through which the passengers may provide answers or other responsive information to the autonomous vehicle 300. In some instances, the user interface 380 may include tablet computers, touch-sensitive displays, speakers, microphones, and the like. For example, in some aspects, the autonomous vehicle 300 may indicate a presence of a pothole at a specified drop-off location on the touch-sensitive display. In other aspects, the autonomous vehicle 300 may indicate the presence of the pothole on a display screen of the user's device. The autonomous vehicle 300 may ask a passenger whether he or she would prefer an alternate drop-off location. Optionally, the autonomous vehicle 300 may display the location of the alternate drop-off location (and optionally other alternatives from which the user can select). In response thereto, the passenger may use the touch-sensitive display to indicate whether the specified drop-off location is acceptable, or whether an alternate drop-off location is preferred. The user interface 380 may be provided in any suitable location within the autonomous vehicle including, for example, embedded within the back surface of the front seats. In other implementations, a passenger's mobile computing device may provide some or all the functionalities of the user interface 378.

The vehicle controller 310 may include a data store 320, one or more processors 330, a memory 340, and a number of system engines 350. The data store 320 may include drop-off/pick-up location data 321, navigation data 322, entry/exit point data 323, obstacle data 324, and user profile data 325. The drop-off/pick-up location data 321 may include drop-off locations for passengers being transported by the autonomous vehicle. The drop-off/pick-up location data 321 may also include pick-up locations for one or more passengers scheduled for pick-up by the autonomous vehicle. In some instances, the drop-off/pick-up location data 321 may also store historical information relating to a number of previous drop-off or pick-up locations.

The navigation data 322 may include route information for rides requested by the passengers, road conditions, traffic conditions, weather conditions, construction activity, event conditions (e.g., scheduled times for near-by events), and any other information associated with navigating the autonomous vehicle 300 from a pick-up location to a drop-off location for a respective passenger. In some instances, the navigation data 322 may include map data and/or sensor data such as street views, satellite view, and the like. In other instances, the navigation data 322 may include the received detailed map information discussed above.

The entry/exit point data 323 may include information indicating the expected exit point of the autonomous vehicle 300 for each passenger currently being transported in the autonomous vehicle 300 and may store information indicating the expected entry point of the autonomous vehicle 300 for each passenger scheduled to be picked up by the autonomous vehicle 300. In some instances, the entry/exit point data 323 may be correlated with information stored in one or both of the drop off/pick up data 321 and the obstacle data 324. In other instances, the entry/exit point data 323 may indicate a default entry and/or exit point of the autonomous vehicle 300 for one or more passengers. For example, as the autonomous vehicle 300 approaches a drop-off location, the autonomous vehicle 300 may instruct one or more passengers to exit through a right-rear door (or another suitable door) of the autonomous vehicle 300. In some implementations, the autonomous vehicle 300 may open a particular door of the autonomous vehicle 300 for a respective passenger to enter or exit the autonomous vehicle 300. In some instances, the autonomous vehicle 300 may lock the other doors when approaching the drop-off or pick-up location, for example, to increase the safety of the passengers.

The obstacle data 324 may include information indicative of one or more previously detected attributes, features, or characteristics of a number of objects, obstacles, and/or hazardous conditions. The obstacle data 324 may also indicate the precise positions (e.g., within 50 centimeters or less) of the previously detected objects, obstacles, or hazardous conditions, in either absolute terms or relative to one or more stored drop-off or pick-up locations. In some instances, the stored attributes, features, or characteristics of a particular obstacle may be used to assist the autonomous vehicle in detecting or identifying the particular obstacle when approaching a corresponding drop-off or pick-up location.

The user profile data 325 may include profile information for any number of past, current, or expected passengers of the autonomous vehicle 300. The profile information for a respective passenger may include the passenger's identification information (such as name, age, height, and so on), the passenger's preferences (such as whether the passenger typically travels with an infant or small child, an amount of luggage or cargo typically brought by the passenger, a willingness to enter or exit the autonomous vehicle when an obstacle or hazardous condition is detected at or near a selected pick-up or drop-off location, and so on). In some instances, some or all the passenger profile data may be obtained from the vehicle control systems 110 and 200 of FIGS. 1 and 2, respectively. In other instances, at least some of the passenger profile data may be provided by the passenger, such as by accessing profile information from a client device 120 of the passenger.

In some implementations, the user profile data 325 (or other profile data) may include profile information for one or more shipping services. The profile information for a respective shipping service can indicate special requirements associated with one or more types of cargo to be transported by the autonomous vehicle 300 on behalf of the respective shipping service. For example, the special requirements may include (but are not limited to) a time-consuming loading or unloading process, a need for certain loading/unloading equipment for the cargo (e.g., a dolly, a forklift, a crane, a ramp, a conveyor belt, and so on), a need for a certain amount of space for loading/unloading the cargo (such as for pieces of lumber, pipes, beams, and the like having a length greater than a value), or a need for specialized loading/unloading areas for the cargo (such as areas with a ramp). In one example implementation, the special requirements may indicate a protocol for picking up a package or other delivery item. For example, the protocol may call for the autonomous vehicle 300 to wait for or otherwise not occupy a parking space at or near the pick-up location until receiving confirmation that the package or other delivery item was dropped-off at the pick-up location.

In various implementations, the user profile data 325 (or other profile data) may include profile information for one or more delivery services. The delivery services may include (but are not limited to) food delivery services, prescription medication delivery services, grocery delivery services, and the like. In some implementations, the profile information for a respective delivery service can indicate special requirements associated with picking up and/or loading items for delivery into the autonomous vehicle 300. For example, the special requirements may include (but are not limited to) a specific area of a restaurant to park and wait for delivery orders to be loaded into the autonomous vehicle 300, a designated lane in which the autonomous vehicle 300 is to wait for delivery orders to be loaded into the autonomous vehicle 300, and so on. In some instances, the profile information for a respective delivery service can also indicate special procedures associated with picking up delivery orders at various vendors (such as food orders from Chick-fil-a). For example, the special procedures may indicate (but are not limited to) signals or prompts indicating that the food order is not ready for delivery, that the food order was canceled, that the food order has been loaded into the autonomous vehicle 300, and so on.

In various implementations, the profile information for a respective delivery service can indicate special requirements and/or procedures associated with dropping off and/or unloading delivery orders at a consumer's location. For example, the special requirements may include (but are not limited to) a designated area for the autonomous vehicle 300 to park at the consumer's premise and wait for the consumer to retrieve (or for a passenger to deliver) the delivered items from the autonomous vehicle 300, may include a period of time for the autonomous vehicle 300 to wait for the consumer to retrieve (or for a passenger to deliver) the delivered items from the autonomous vehicle 300, and so on.

The processors 330 may be or may include any number of commercially available microprocessors or central processing units (CPUs) capable of executing scripts or instructions of one or more software programs stored in associated memory. In addition, or in the alternative, the processors 330 may be or may include any number of ASICs, GPUs, DSPs, NSPs, DPUs, microcontrollers, hardware accelerator(s), FPGAs, PLDs, or any combination thereof.

The memory 340 may include a non-transitory computer-readable medium (such as one or more nonvolatile memory elements, such as EPROM, EEPROM, Flash memory, a hard drive, etc.) storing instructions that, when executed by the one or more processors 330, cause the vehicle controller 310 to perform any number of the operations described with reference to FIGS. 6, 7A-7B, 8, 9, 10, 11A-11B, 12, 13A-13C, 14, and 15. The instructions may be any set of instructions to be executed directly (such as machine code) or indirectly (such as scripts) by the processors 330. For example, the instructions may be stored as computing device code on the computing device-readable medium. As such, the terms "instructions" and "programs" may be used interchangeably herein. The instructions may be stored in object code format for direct processing by the processor, or in any other computing device language including scripts or collections of independent source code modules.

The system engines 350 may include (but is not limited to) a vehicle control engine 352, a navigation engine 354, an object detection engine 356, and a passenger positioning engine 358. The vehicle control engine 352 may assist or operate the autonomous vehicle 300 when determining a suitable drop-off or pick-up location for passengers. The vehicle control engine 352 may also assist or operate the autonomous vehicle 300 when determining one or more alternate drop-off or pick-up locations based on a presence of detected obstacles or hazardous conditions at or near a drop-off or pick-up location, physical limitations of a respective passenger, physical attributes of the respective passenger, an age of the respective passenger, a presence of infants or children with the respective passenger, an amount of luggage or cargo associated with the respective passenger, or any combination thereof.

The navigation engine 354 may be used to navigate the autonomous vehicle 300 to and from passenger-specified locations (such as along a route between a passenger pick-up location and a passenger drop-off location). The navigation engine 354 may also be used to select, identify, or determine passenger pick-up locations and drop-off locations. The navigation engine 354 may be used to modify passenger pick-up or drop-off locations. The navigation engine 354 may also be used to determine alternate passenger pick-up or drop-off locations. In some instances, the navigation engine 354 may identify or select pick-up or drop-off locations at which the autonomous vehicle 300 can wait for a passenger, can stop and wait for a passenger to perform some task and enter to the vehicle, or stop long enough to allow a departing passenger to perform some task and then proceed without the autonomous vehicle. As explained in more detail below, various aspects of the subject matter disclosed herein may increase the usefulness, safety, and convenience of autonomous vehicles that provide passenger service.

The object detection engine 356 may be used to detect an obstacle or hazardous condition at or near a specified drop-off or pick-up location. In some instances, the object detection engine 356 may employ one or more of the exterior sensors 376 to detect and determine the location of hazards/obstacles, such as (but not limited to) water puddles, ice patches, potholes, uneven pavement, high curbs, storm drains, garbage, construction barriers, other vehicles, obstructions (e.g., fire hydrants, walls, trees, etc.), weather conditions, a fire line, a no parking zone, a closed lane within a vicinity of the identified drop-off or pick-up location, or less than a certain amount of room in front of or behind the autonomous vehicle 300.

In some implementations, the profile information for a respective passenger can indicate or identify which of a plurality of potential obstacles or hazardous conditions the respective passenger considers to be of little or no concern with respect to entering and/or exiting the autonomous vehicle. For example, the plurality of potential obstacles or hazardous conditions may include (but are not limited to) a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, or less than a certain amount of room in front of or behind the autonomous vehicle.

In some implementations, the autonomous vehicle 300 may determine to not modify a particular drop-off or pick-up location for the respective passenger when the obstacles or hazardous conditions detected by the autonomous vehicle 300 include only those obstacles or hazardous conditions identified as being of little or no concern to the respective passenger. For example, if a first passenger's profile information indicates that water puddles, potholes, uneven pavement, and high curbs are of little or no concern when entering or exiting the autonomous vehicle 300, the autonomous vehicle 300 may not modify a particular drop-off or pick-up location for the first passenger when water puddles, potholes, uneven pavement, and/or high curbs are detected within an area of the particular drop-off or pick-up location. In this way, the first passenger may not be inconvenienced with having to wait for the autonomous vehicle to find an alternative drop-off or pick-up location or with having to walk greater distances to a destination when there is a water puddle, a pothole, uneven pavement, and/or high curbs near an expected entry or exit point of the autonomous vehicle.

In some instances, the autonomous vehicle 300 may modify a particular drop-off or pick-up location for the first passenger when an obstacle or hazardous condition not identified in the first passenger's profile information (such as an ice patch or garbage) is detected within an area of the particular drop-off or pick-up location. In this way, the first passenger may be comfortable knowing that the autonomous vehicle 300 will find an alternate drop-off or pick-up location if an obstacle or hazardous condition other than a water puddle, a pothole, uneven pavement, and/or a high curb is detected within the area of the drop-off or pick-up location.

In various implementations, the profile information for different passengers may indicate different potential obstacles or hazardous conditions (or none at all) that are of little or no concern with respect to entering and/or exiting the autonomous vehicle 300. For example, a second passenger's profile information may indicate that garbage and construction barriers are of little or no concern to the second passenger when entering or exiting the autonomous vehicle 300. Based on the profile information of the second passenger, the autonomous vehicle 300 may not modify a particular drop-off or pick-up location for the second passenger when garbage and/or construction barriers are detected within an area of the particular drop-off or pick-up location. In this way, the second passenger may not be inconvenienced with having to wait for the autonomous vehicle to find an alternative drop-off or pick-up location or with having to walk greater distances to a destination when there is garbage and/or construction barriers near an expected entry or exit point of the autonomous vehicle 300. Conversely, when the autonomous vehicle 300 detects an obstacle or hazardous condition that is of concern to the second passenger (e.g., an ice patch), the autonomous vehicle 300 may modify the drop-off or pick-up location for the second passenger. In this way, the second passenger may be comfortable knowing that the autonomous vehicle 300 will find an alternate drop-off or pick-up location if an obstacle or hazardous condition other than garbage or construction barriers is detected within the area of the drop-off or pick-up location.

The passenger positioning engine 358 may be used to determine the positions of passengers carried by the autonomous vehicle 300 absolutely or relative to one another, relative to their respective vehicle exit points, and/or relative to each of one or more detected obstacles or hazardous conditions. The passenger positioning engine 358 may also determine the seating positions of passengers carried by the autonomous vehicle 300. In some instances, the passenger positioning engine 358 may communicate with the sensors 372 and 376.

Figure 4A:
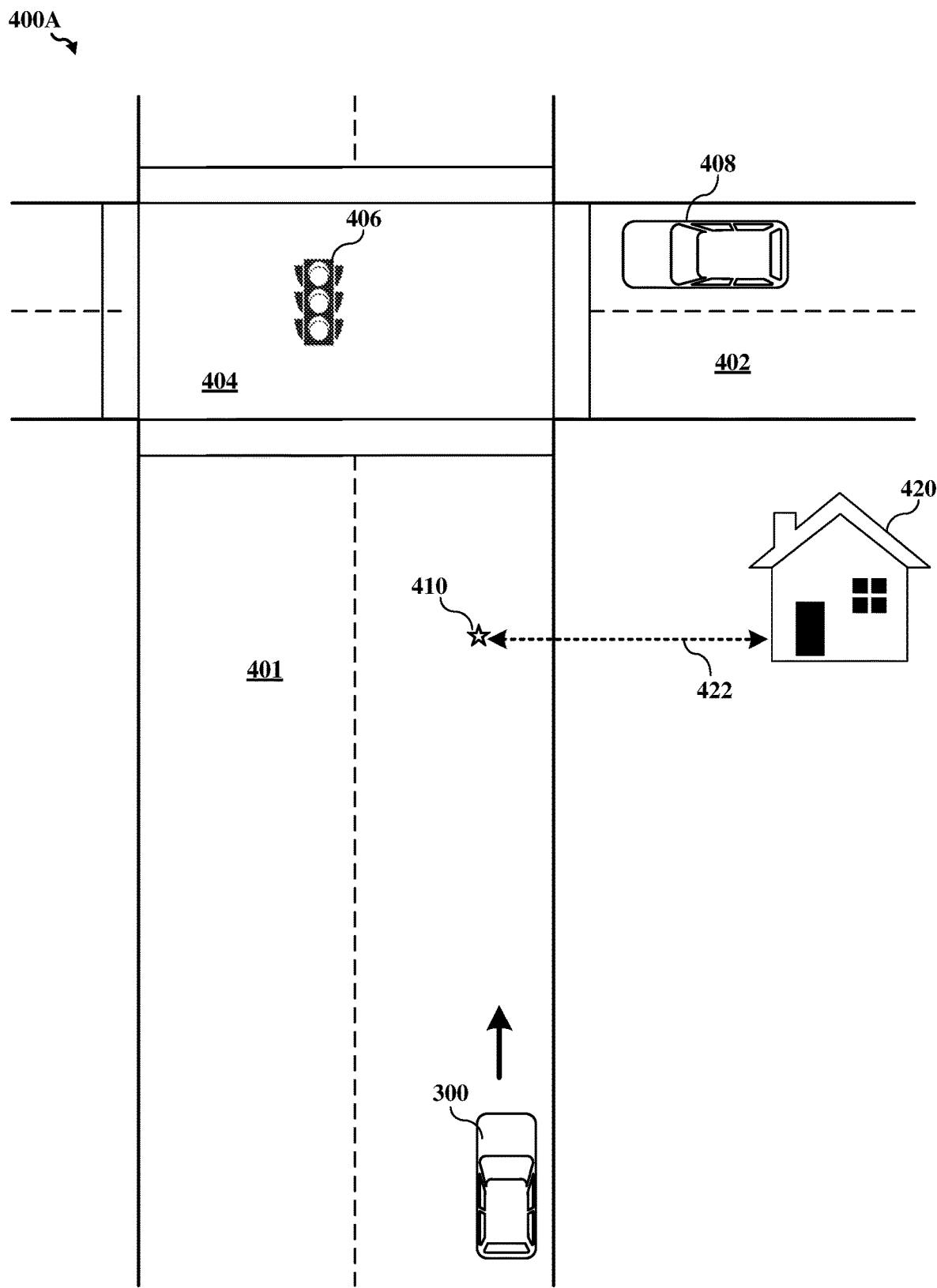
Figure 4C:
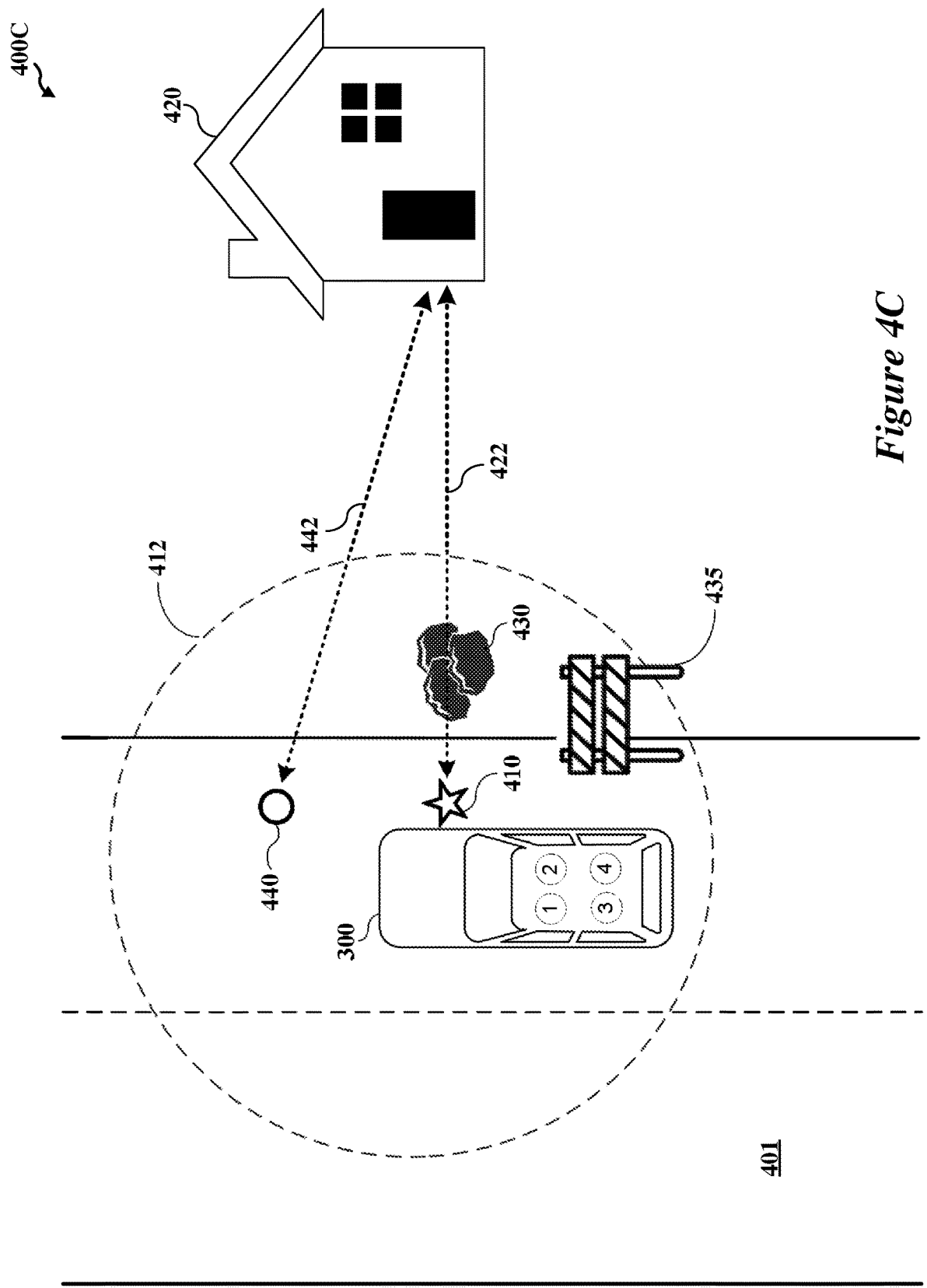

FIGS. 4A-4C show respective illustrations 400A-400C depicting a vehicle such as an autonomous vehicle dropping off and picking up passengers according to some implementations. For the example operations discussed with reference to FIGS. 4A-4C, the autonomous vehicle 300 is scheduled to drop-off a first passenger riding in the autonomous vehicle 300 at a selected location 410, and to pick-up a second passenger waiting inside a house 420 near the selected location 410. Thus, for the example illustrations 400A-400C of respective FIGS. 4A-4C, the selected location 410 may be referred to as the selected drop-off and pick-up location 410. As depicted in FIG. 4A, the autonomous vehicle 300 is driving along a first street 401 towards the selected drop-off and pick-up location 410. The first street 401 crosses a second street 402 at an intersection 404 equipped with a traffic light 406. Another vehicle 408 is stopped on the second street 402 at the traffic light 406. The selected drop-off location 410 is in front of the house 420, which may be indicated as the destination of the first passenger. That is, once the autonomous vehicle 300 stops at the drop-off location 410, the first passenger is expected to exit the autonomous vehicle 300 and walk to the house 420 along a path 422, and the second passenger is expected to walk from the house 420 to the pick-up location 410 along the path 422 and thereafter enter the autonomous vehicle 300.

In some implementations, the autonomous vehicle 300 may determine an expected exit point of the autonomous vehicle 300 for the first passenger. The autonomous vehicle 300 may determine an expected entry point of the autonomous vehicle for the second passenger. The autonomous vehicle 300 may also determine a seating position of the first passenger (and the seating positions of other passengers, if present). The autonomous vehicle 300 may determine the relative positions of the expected exit point for the first passenger and/or the seating position of the first passenger.

FIG. 4B shows an illustration 400B depicting the autonomous vehicle 300 traveling along the street 401 towards the selected drop-off and pick-up location 410. Specifically, as the autonomous vehicle 300 comes within a distance of an area 412 around the selected drop-off and pick-up location 410, the autonomous vehicle 300 detects a garbage pile 430 and a construction barrier 435 within the area 412. The area 412 may be of any suitable diameter or other dimensions. The area 412 may be of different sizes for different drop-off and pick-up locations. In some instances, the distance may correspond to a scanning range of one or more external sensors 372 of the autonomous vehicle 300 (such as the scanning range of the LIDAR sensors). The garbage pile 430 and the construction barrier 435 are merely exemplary and thus are only two of many possible obstacles and hazardous conditions that can be detected by the autonomous vehicle 300.

The autonomous vehicle 300 may use any suitable sensors or devices, in conjunction with any suitable object detection mechanism, to detect the presence and determine the positions of the garbage pile 430 and the construction barrier 435. In some implementations, the autonomous vehicle 300 may scan the surrounding environment for objects or surfaces (e.g., using LIDAR sensors, IR sensors, RF sensors, mmW frequency sensors, SONAR, cameras, or any combination thereof). The autonomous vehicle may generate a three-dimensional map of points corresponding to the locations of the garbage pile 430 and the construction barrier 435. The resulting three-dimensional map of points, or "point cloud," may be used to determine the precise positions of the garbage pile 430 and the construction barrier 435.

For the example of FIG. 4B, the garbage pile 430 lies directly on the path 422 between the selected drop-off and pick-up location 410 and the house 420, and impedes the ability of the first passenger to safely and comfortably exit the autonomous vehicle 300 and walk to the house 420 along the path 422. The garbage pile 430 may also prevent the second passenger from safely and comfortably walk from the house 420 to the selected drop-off and pick-up location 410 along the path 422.

In some implementations, the autonomous vehicle 300 may determine to maintain the selected drop-off and pick-up location 410. In other implementations, the autonomous vehicle 300 may determine to modify the selected drop-off and pick-up location 410. In particular implementations, the autonomous vehicle 300 may modify the selected location 410 for dropping off the first passenger based at least in part on the expected vehicle exit point for the first passenger relative to the garbage pile 430. The autonomous vehicle may modify the selected location 410 (if determined to be different from where the first passenger was dropped off) for picking up the second passenger based at least in part on the expected vehicle entry point for the second passenger relative to the garbage pile 430. In some instances, the autonomous vehicle 300 may maintain the selected location 410 for passenger pickup when the expected entry point of the autonomous vehicle 300 and the detected obstacles or hazardous conditions are on different sides of the autonomous vehicle 300. The autonomous vehicle 300 may select an alternate pick-up location when the expected entry point and the detected obstacles or hazardous conditions are on the same side of the autonomous vehicle 300. Similarly, the autonomous vehicle 300 may maintain the selected location 410 for passenger drop-off when the expected exit point of the autonomous vehicle 300 and the detected obstacles or hazardous conditions are on different sides of the autonomous vehicle 300. The autonomous vehicle 300 may select an alternate drop-off location when the expected exit point and the detected obstacles or hazardous conditions are on the same side of the autonomous vehicle 300. In some instances, the autonomous vehicle 300 may also consider physical handicaps or limitations of the first passenger when selecting alternate drop-off locations.

In addition, or in the alternative, the autonomous vehicle 300 may consider the seating position of the first passenger (and other passengers, if present) when determining whether to modify or change the selected location 410 as the drop-off location. For the example of FIG. 4B, the first passenger is sitting in seating position number 4 and is expected to exit on the right side of the autonomous vehicle 300. The garbage pile 430 and the construction barrier 435 are also on the right side of the autonomous vehicle 300. In response to determining that the expected exit point and the detected obstacles are on the same side of the vehicle, the autonomous vehicle 300 may determine to modify the selected drop-off location and select an alternate drop-off location. Similarly, in response to determining that the expected entry point of the second passenger and the detected obstacles are on the same side of the vehicle, the autonomous vehicle 300 may modify the selected pick-up location and select an alternate pick-up location. When carrying multiple passengers, the autonomous vehicle 300 may select different alternate drop-off locations for different passengers, or may select the same alternate drop-off location for multiple passengers.

FIG. 4C shows an illustration 400C depicting the autonomous vehicle 300 selecting an alternate drop-off and pick-up location 440. In some implementations, the alternate drop-off and pick-up location 440 may be selected from a plurality of different alternate drop-off or pick-up locations within a distance of the selected drop-off and pick-up location 410. The plurality of different alternate drop-off or pick-up locations may be identified or determined based on one or more of map data, LIDAR sensor data, images of the surrounding area, video of the surrounding area, RADAR sensor data, or passenger input. In some implementations, the autonomous vehicle 300 can receive LIDAR sensor data, RADAR sensor data, images of the surrounding area, video of the surrounding area, and other sensor data directly from sensors provided on or within the autonomous vehicle 300. In other implementations, the autonomous vehicle 300 can receive LIDAR sensor data, RADAR sensor data, images of the surrounding area, video of the surrounding area, and other sensor data directly from other sources such as (but not limited to) road-side units, other vehicles, user devices, or any combination thereof. In some other implementations, the autonomous vehicle 300 can receive LIDAR sensor data, RADAR sensor data, images of the surrounding area, video of the surrounding area, and other sensor data from a server (or other intermediary system or service) that can, at least in some instances, aggregate the sensor data. In some instances, the autonomous vehicle may select the different alternate drop-off locations based at least in part on a physical limitation of the first passenger, or a presence of infants, car seats, or children traveling with the first passenger. In other implementations, the autonomous vehicle 300 may determine that the selected drop-off and pick-up location 410 is not viable based at least in part on one or more physical attributes of the first passenger, and may identify one or more viable alternate drop-off locations based at least in part on the one or more physical attributes of the first passenger.

A number of different alternate drop-off locations may be presented to the first passenger, for example, on a user interface such as a touch-sensitive display. The first passenger may select or indicate a preference for one of the alternate drop-off locations. The autonomous vehicle 300 may determine to maneuver to the alternate drop-off location selected by the first passenger. In some instances, the autonomous vehicle 300 may determine a willingness of the first passenger to ignore the garbage pile 430 or construction barrier 435 and maintain the selected drop-off location 410 for the first passenger. The passenger's willingness may be stored in a passenger profile, or may be provided by the first passenger in response to detection of the garbage pile 430 or construction barrier 435. In some other instances, the autonomous vehicle 300 may prompt a respective passenger to indicate whether one or more potentially hazardous conditions detected by the autonomous vehicle 300 are of concern to the respective passenger when entering and/or exiting the autonomous vehicle 300.

By allowing the autonomous vehicle 300 to dynamically change passenger drop-off and pick-up locations based on obstacles or hazardous conditions detected near the selected drop-off and pick-up location 410, the autonomous vehicle 300 may ensure that passengers are not impeded or inconvenienced by obstacles or hazardous conditions when entering or exiting the autonomous vehicle. In this manner, autonomous vehicles implementing various aspects of the subject matter disclosed herein may pick-up and drop-off passengers in a safer and more convenient manner than conventional autonomous vehicles.

Figure 5A:
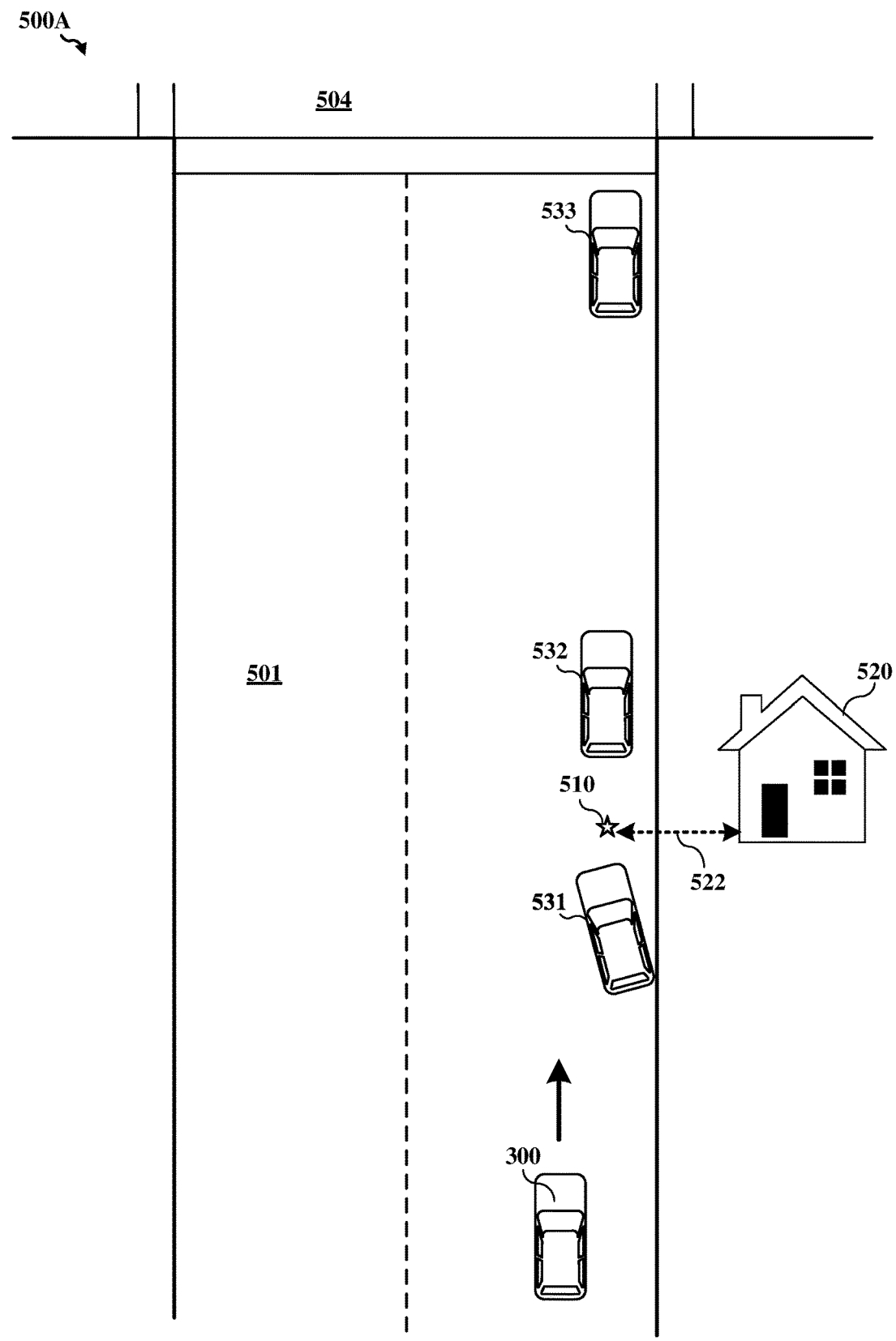
FIGS. 5A-5C show illustrations depicting a vehicle modifying a drop-off or pick-up location, according to some other implementations.
Figure 5B:
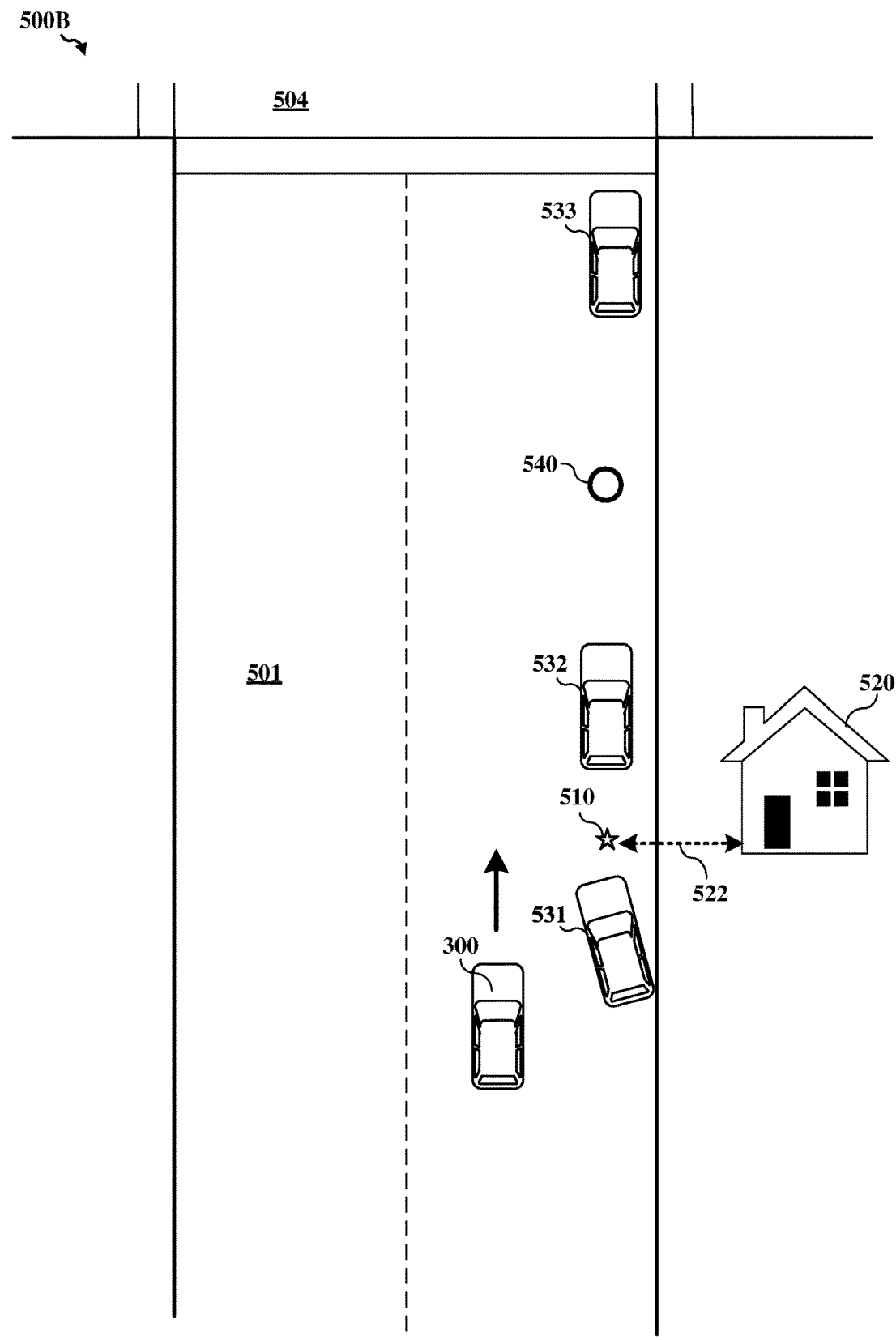
Figure 5C:
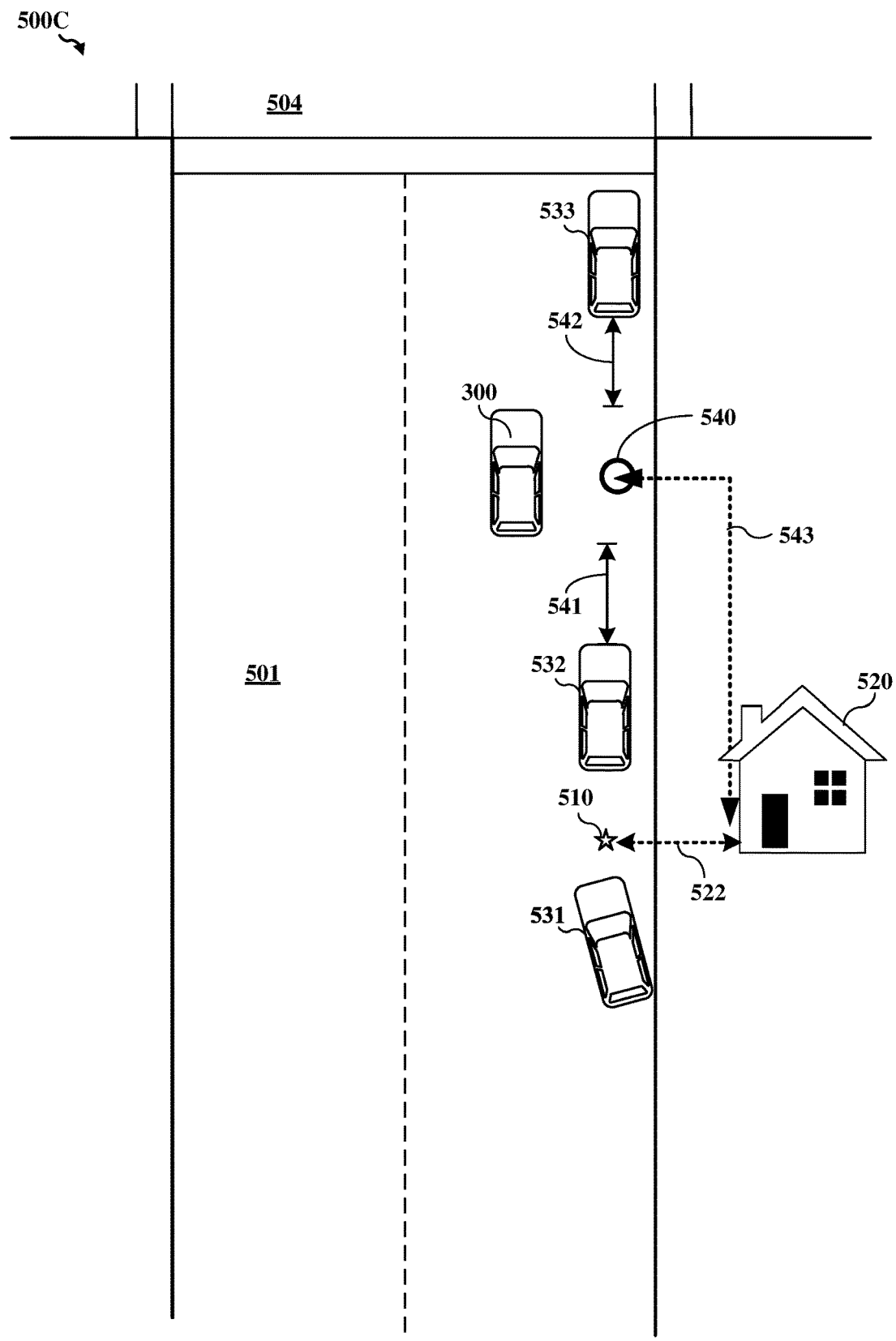

FIGS. 5A-5C show respective illustrations 500A-500C depicting a vehicle such as an autonomous vehicle dropping off and picking up passengers according to various implementations. For the example operations discussed with reference to FIGS. 5A-5C, the autonomous vehicle 300 is scheduled to drop-off a first passenger riding in the autonomous vehicle 300 at the selected location 510, and to pick-up a second passenger waiting inside a house 520 at the selected location 510. Thus, the selected location 510 may be referred to as the selected drop-off and pick-up location 510. In other examples, the drop-off location may be different from the pick-up location. As depicted in FIG. 5A, the autonomous vehicle 300 is driving along a street 501 towards an intersection 504, and the selected drop-off and pick-up location 510 is in front of the house 520, which may be the destination of the first passenger. That is, once the autonomous vehicle 300 stops at the drop-off location 510, the first passenger is expected to exit the autonomous vehicle 300 and walk to the house 520 along a path 522, and the second passenger is expected to walk from the house 520 to the pick-up location 510 along the path 522, and thereafter enter the autonomous vehicle 300.

FIG. 5A also shows a first car 531, a second car 532, and a third car 533 are parked on the right side of the street 501. Specifically, the first car 531 is parked just before the selected drop-off and pick-up location 510, and the second car 532 is parked just after the selected drop-off and pick-up location 510. The third car 533 is parked a distance away from the second car 532. The first and second cars 531 and 532 are each parked close enough to the selected drop-off and pick-up location 510 that may render the selected drop-off and pick-up location 510 not viable for passengers that require additional space or time to enter or exit the autonomous vehicle 300. In various implementations, the autonomous vehicle can communicate with an edge server or other server in a communications network (such as but not limited to an LTE communications network, a 5G NR communications network, a wireless local area network (WLAN), a metropolitan area network (MAN), a wide area network (WAN), a personal area network (PAN), a mesh network, the Internet, and so on) and receive information indicating the locations, capacities, configurations, availabilities, and various characteristics of other vehicles expected to be at or near the determined pick-up and/or drop-off location when the autonomous vehicle is to arrive at or depart from the determined pick-up and/or drop-off location. In one example implementation, the autonomous vehicle can coordinate passenger pick-ups and/or passenger drop-offs with one or more of the other vehicles based on the passengers' schedules, the passengers' physical conditions, the passengers' time and space requirements for entering/exiting the autonomous vehicle, a presence of obstacles or hazardous conditions at or near passenger drop-off and pick-up sites, traffic conditions, weather conditions, or any combination thereof. In some aspects, when the autonomous vehicle is at or near a respective pick-up and/or drop-off location (or approaching the respective pick-up and/or drop-off location), the autonomous vehicle can communicate with the other vehicles (e.g., over a PC5 link) to request temporary access to a parking spot held by one of the other vehicles. In response to the request, the other vehicle may adjust its pose and position, or may temporarily leave the spot, to allow the autonomous vehicle to temporarily use the parking spot for passenger drop-offs and/or pick-ups.

In some instances, the autonomous vehicle 300 may identify a physical handicap or limitation of the first passenger. The autonomous vehicle 300 may determine whether the first passenger requires additional time or space to exit the autonomous vehicle 300 based at least in part on the identified physical handicap or physical limitation and one or more attributes of the selected drop-off and pick-up location 510. The one or more attributes of the selected drop-off and pick-up location 510 may include (but is not limited to) one or more of a water puddle, an ice patch, a pothole, uneven pavement, high curbs, storm drains, garbage, construction barriers, other vehicles, obstructions (e.g., fire hydrants, walls, trees, etc.), weather conditions, a fire line, a no parking zone, a closed lane within a vicinity of the identified drop-off or pick-up location, or less than a certain amount of space in front of or behind the autonomous vehicle 300.

In some implementations, the autonomous vehicle 300 may also determine whether each passenger riding (or to be picked up) in the autonomous vehicle 300 is accompanied by an infant, a car seat, or small children, and/or is traveling with an amount of luggage, cargo, or equipment that requires additional time and/or space to enter or exit the autonomous vehicle. In some aspects, the amount of luggage, cargo, or equipment deemed to require additional time and/or space can be based on a total weight of the luggage, cargo, or equipment, a total size or volume of the luggage, cargo, or equipment, physical attributes of the passenger, historical data indicating the time and/or space required by a passenger for one or more previous rides in the autonomous vehicle, or any combination thereof. The autonomous vehicle 300 may determine whether each passenger needs additional time and/or space for loading during passenger pick-up and unloading during passenger drop-off. For example, a passenger traveling with skis, poles, and camping equipment will need more time and more space in front of the autonomous vehicle 300 to load and unload the skis, poles, and camping equipment than other passengers not traveling with any such equipment. For another example, a passenger traveling with an infant in a car seat will need more time and more space on a side of the autonomous vehicle 300 to load and unload the infant and the car seat than other passengers not traveling with children. Thus, in some instances, the autonomous vehicle 300 may consider the additional time and/or space needed by a respective passenger when determining whether to maintain the selected drop-off and pick-up location 510 or to determine one or more viable alternative pick-up and drop-off locations. The additional space may correspond to one or more of a first area proximate to a front end of the autonomous vehicle 300, a second area proximate to a rear end of the autonomous vehicle 300, a third area proximate to a passenger-side of the autonomous vehicle 300, or a fourth area proximate to a driver-side of the autonomous vehicle 300.

In some instances, the autonomous vehicle 300 may also consider one or more attributes of the selected drop-off and pick-up location 510 when determining whether a respective passenger needs additional time or space to enter the autonomous vehicle 300 at pick-up locations and to exit the autonomous vehicle 300 at drop-off locations. For example, when the area proximate to the front, rear, or exit side of the autonomous vehicle 300 would be less than a certain value if the autonomous vehicle 300 were to stop or park at the selected drop-off and pick-up location 510, the autonomous vehicle 300 may determine that the respective passenger requires more time and/or space than is available at the selected drop-off and pick-up location 510.

FIG. 5B shows an illustration 500B depicting the autonomous vehicle 300 traveling along the street 501 towards the selected drop-off and pick-up location 510. As the autonomous vehicle 300 comes within a certain range of the selected drop-off and pick-up location 510, the autonomous vehicle 300 may determine that the first passenger needs more space and/or time to exit the autonomous vehicle 300 than the selected drop-off location 510 allows. The autonomous vehicle 300 may modify the selected drop-off location 510 for the first passenger. Similarly, the autonomous vehicle 300 may determine that the second passenger needs more space and/or time to enter the autonomous vehicle 300 than the selected pick-up location 510 allows. Based on the determination, the autonomous vehicle 300 may modify the selected pick-up location 510 for the second passenger. The autonomous vehicle 300 may select an alternate drop-off or pick-up location 540 in response to determining that the first and second passengers need additional time and/or space.

FIG. 5C shows an illustration 500C depicting the autonomous vehicle 300 selecting the alternate drop-off and pick-up location 540. The alternate location 540 is approximately halfway between the house 520 and the intersection 504. For instances in which the house 520 is the destination of the first passenger, the first passenger may be expected to exit the autonomous vehicle 300 at the alternate location 540 and walk to the house 520 along a path 543. Similarly, for instances in which the house 520 is the origination of the second passenger, the second passenger may be expected to walk from the house 520 to the alternate pick-up location 540 along the path 543. In some implementations, the alternate drop-off and pick-up location 540 may be selected from a plurality of different alternate drop-off or pick-up locations within a distance of the selected drop-off and pick-up location 510. The plurality of different alternate drop-off or pick-up locations may be identified or determined based on (but not limited to) one or more of map data, LIDAR sensor data, images of the surrounding area, video of the surrounding area, RADAR, or passenger input. In some instances, the autonomous vehicle 300 may select the different alternate drop-off locations based at least in part on a physical limitation of the first passenger, or a presence of infants, car seats, or children traveling with the first passenger. In other implementations, the autonomous vehicle 300 may determine that the selected drop-off and pick-up location 510 is not viable based at least in part on one or more physical attributes of the first passenger. The autonomous vehicle 300 may identify one or more viable alternate drop-off locations based at least in part on the one or more physical attributes of the first passenger.

For the example of FIG. 5C, the autonomous vehicle 300 may determine that a first distance 541 between the second car 532 and the rear end of the autonomous vehicle 300 provides sufficient space and/or time for departing passengers to retrieve luggage and other items from the trunk of the autonomous vehicle 300. The autonomous vehicle 300 may also determine that the first distance 541 provides sufficient space and/or time for embarking passengers to stow luggage and other items in the trunk of the autonomous vehicle 300. Similarly, the autonomous vehicle 300 may determine that a second distance 542 between the third car 533 and the front end of the autonomous vehicle 300 provides sufficient space and/or time for departing passengers to retrieve equipment and items (such as bikes and skis) mounted on racks in the front of the autonomous vehicle 300. The autonomous vehicle 300 may also determine that the second distance 542 provides sufficient space and/or time for embarking passengers to stow equipment and items (such as bikes and skis) mounted on racks in the front of the autonomous vehicle 300. In some implementations, the autonomous vehicle 300 may also estimate or otherwise determine a distance between the alternate location 540 and the house 520 along the expected path 543. In some instances, the autonomous vehicle 300 can notify the first passenger of the estimated distance along the path 543 to the house 520. In some other instances, the autonomous vehicle 300 can also notify the second passenger of the estimated distance along the path 543 from the house 520 to the alternate pick-up location 540.

Some or all of the different alternate drop-off locations may be presented to the first passenger, for example, on a user interface such as a touch-sensitive display. The first passenger may select or indicate a preference for one of the alternate drop-off locations. The autonomous vehicle 300 may drive to the alternate drop-off location selected by the first passenger.

By allowing a vehicle such as an autonomous vehicle to dynamically change passenger drop-off and pick-up locations based physical limitations and/or whether one or more passengers requires additional time or space to enter or exit the vehicle, the vehicle may ensure that passengers needing extra time or space are picked up and dropped off at locations that afford additional space and/or time for passengers to enter or exit the vehicle. In this manner, vehicles implementing various aspects of the subject matter disclosed herein may pick-up and drop-off passengers in a safer and more convenient manner than conventional vehicles.

In some other implementations, the autonomous vehicle 300 may determine to drop off and/or pick up passengers in an area that is proximate to a scheduled drop-off or pick-up location but not designated for parking or passenger drop-offs or pick-ups. For example, when a scheduled drop-off or pick-up location in a city environment is not available (e.g., because other cars are parked at the scheduled drop-off or pick-up location), the autonomous vehicle 300 may determine that temporarily double-parking provides sufficient time and space for passengers to enter and/or exit the autonomous vehicle 300 safely with minimal impact to traffic and the like, and is also relatively close to the scheduled drop-off or pick-up location (such as within a certain distance of the scheduled drop-off or pick-up location). For another example, when a scheduled drop-off or pick-up location in a suburban area is not accessible (e.g., blocked by other cars), the autonomous vehicle 300 may determine that parking in an adjacent driveway provides sufficient time and space for passengers to enter and/or exit the autonomous vehicle 300, and is also relatively close to the scheduled drop-off or pick-up location (such as within a certain distance of the scheduled drop-off or pick-up location).

Figure 6A:
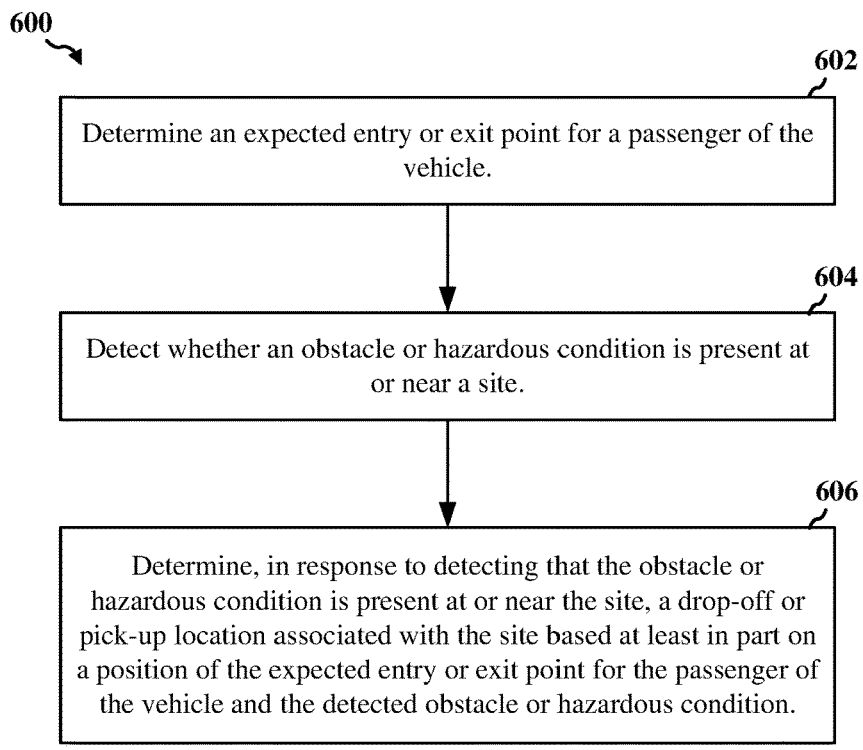
FIG. 6A shows a flow chart depicting an example operation for determining passenger drop-off or pick-up locations, according to some implementations.

FIG. 6A shows a flow chart depicting an example operation 600 for determining passenger drop-off or pick-up locations, according to some implementations. The operation 600 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). At block 602, the apparatus may determine an expected entry or exit point for a passenger of the vehicle. At block 604, the apparatus may detect whether an obstacle or hazardous condition is present at or near a site. At block 606, the apparatus may determine, in response to detecting that the obstacle or hazardous condition is present at or near the site, a drop-off or pick-up location associated with the site based at least in part on a position of the expected entry or exit point for the passenger of the vehicle and the detected obstacle or hazardous condition.

The detected obstacle or hazardous condition may include a water puddle, an ice patch, a pothole, uneven pavement, high curbs, storm drains, garbage, construction barriers, other vehicles, obstructions (e.g., fire hydrants, walls, trees, etc.), weather conditions, a fire line, a no parking zone, a closed lane within a vicinity of the identified drop-off or pick-up location, less than a certain amount of room in front of or behind the vehicle, or any combination thereof. In some implementations, the vehicle may use detection of a snowbank or snowdrift as an indicator of an obscured obstacle beneath the snow. In some aspects, the vehicle may maneuver around or otherwise avoid detected snowbanks or snowdrifts.

In some instances, determining the drop-off or pick-up location may also be based on whether the expected entry or exit point for the passenger of the vehicle and the detected obstacle or hazardous condition are on a same side of the vehicle. For example, when the detected obstacle or hazardous condition and the expected vehicle entry or exit point for a respective passenger of the vehicle are on the same side of the vehicle, the apparatus may determine an alternate drop-off or pick-up location for the respective passenger. The vehicle may drop-off or pick-up the respective passenger at the alternate drop-off or pick-up location. Conversely, when the detected obstacle or hazardous condition and the expected entry or exit point for a respective passenger of the vehicle are on different sides of the vehicle, the apparatus may maintain the determined drop-off or pick-up location for the respective passenger. The vehicle may drop-off or pick-up the respective passenger at the original drop-off or pick-up location.

The alternate drop-off or pick-up location may be determined from a plurality of different alternate drop-off or pick-up locations within a distance of the determined drop-off or pick-up location. In some instances, the distance may be any suitable threshold distance that is sufficiently long to ensure that the passenger's path to or from the vehicle is not blocked or rendered unsafe by the detected obstacle. The distance may also be sufficiently short to avoid or at least reduce inconvenience to the passenger. In one example implementation, the plurality of alternate drop-off or pick-up locations may be determined or based on map data, LIDAR sensor data, images of the surrounding area, video of the surrounding area, RADAR, passenger input, or any combination thereof.

In some implementations, determining the alternate drop-off or pick-up locations may be based at least in part on one or more conditions associated with the passenger. In some instances, determining the alternate drop-off or pick-up locations may be based at least in part on a physical handicap or limitation of the passenger (which may be considered as a first condition of the passenger). For example, if the passenger has difficulty walking or is in a wheelchair, then the vehicle may determine alternate drop-off or pick-up locations closer to the identified drop-off or pick-up location, may determine alternate drop-off or pick-up locations that provide wheelchair access, and so on. In other instances, determining the alternate drop-off or pick-up locations may be based at least in part on a presence of infants or children with the passenger (which may be considered as a second condition of the passenger). For example, if the passenger is traveling with infants, then the vehicle may determine alternate drop-off or pick-up locations closer to the identified drop-off or pick-up location, may determine alternate drop-off or pick-up locations equipped with diaper changing stations, and so on. In some other instances, determining the alternate drop-off or pick-up locations may be based at least in part on whether the passenger is traveling with a relatively large amount of luggage, cargo, or equipment (which may be considered as a third condition of the passenger). For example, if the passenger is traveling with a relatively large amount of luggage, then the vehicle may determine alternate drop-off or pick-up locations that provide more room for the passenger to load or unload the luggage and/or that affords additional time for the passenger to load or unload the luggage. In some other instances, determining the alternate drop-off or pick-up locations may be based at least in part on an age of the passenger. For example, if the passenger is a child (e.g., less than 13 years old), the vehicle may determine alternate drop-off or pick-up locations that provide room for an adult to help the child exit the vehicle.

Figure 6B:
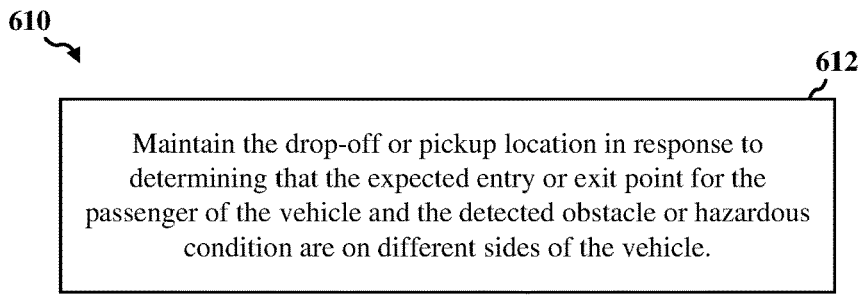
FIG. 6B shows a flow chart depicting an example operation for determining passenger drop-off or pick-up locations, according to other implementations.

FIG. 6B shows a flow chart depicting an example operation 610 for determining passenger drop-off or pick-up locations, according to some implementations. The operation 610 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 610 may be performed after determining the drop-off or pick-up location in block 606 of FIG. 6A. For example, at block 612, the apparatus may maintain the determined drop-off or pickup location in response to determining that the expected entry or exit point for the passenger and the detected obstacle or hazardous condition are on different sides of the vehicle.

Figure 7A:
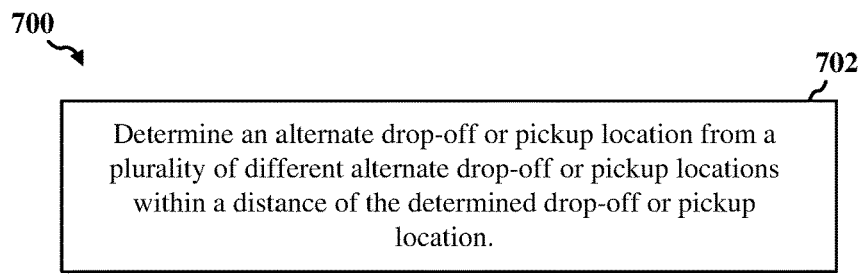
FIG. 7A shows a flow chart depicting an example operation for determining passenger drop-off or pick-up locations, according to some implementations.

FIG. 7A shows a flowchart depicting an example operation 700 for determining passenger drop-off or pick-up locations, according to some implementations. The operation 700 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 700 may be performed after determining the passenger drop-off or pick-up location in block 606 of FIG. 6A. For example, at block 702, the apparatus may determine an alternate drop-off or pick-up location from a plurality of different alternate drop-off or pick-up locations within a distance of the determined drop-off or pick-up location. In this way, the vehicle may ensure that the detected obstacle or hazardous condition does not impede the passenger's path to or from the vehicle while also ensuring that the alternate drop-off or pick-up location is within a distance of the original drop-off or pick-up location.

Figure 7B:
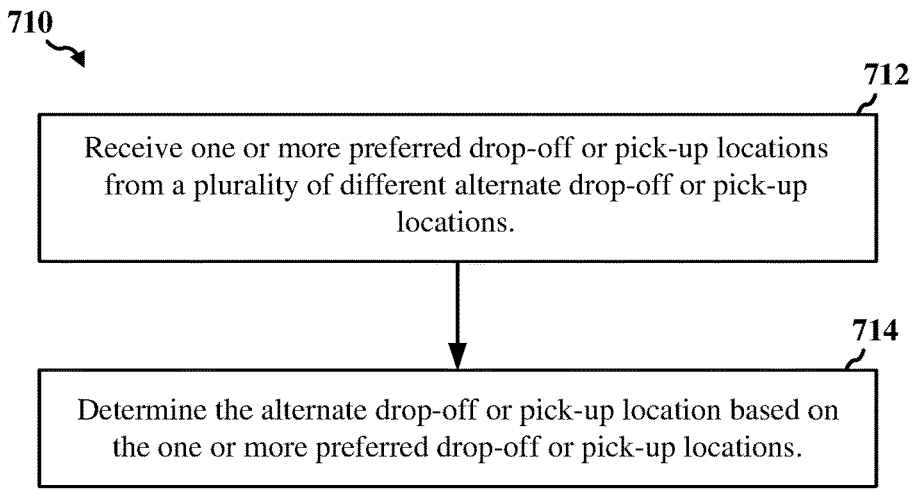
FIG. 7B shows a flow chart depicting an example operation for determining passenger drop-off or pick-up locations, according to some implementations.

FIG. 7B shows a flowchart depicting an example operation 710 for determining passenger drop-off or pick-up locations, according to some implementations. The operation 710 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 710 may be performed concurrently with determining the alternate drop-off or pick-up location in block 702 of FIG. 7A. In other implementations, the operation 710 may be performed after determining the alternate drop-off or pick-up location in block 702 of FIG. 7A. For example, at block 712, the apparatus may receive one or more preferred drop-off or pick-up locations from a plurality of different alternate drop-off or pick-up locations. At block 714, the apparatus may determine the alternate drop-off or pick-up location based on the one or more preferred drop-off or pick-up locations.

In some instances, the vehicle may present some of the alternate drop-off or pick-up locations on a touch-sensitive display viewable by the passengers. The passenger may interact with the touch-sensitive display to determine one of the alternate drop-off or pick-up locations. For example, the alternate drop-off or pick-up locations may be presented as selectable icons on the touch-sensitive display. The passenger may select a particular alternate drop-off or pick-up location by touching, tapping, or otherwise interacting with the selectable icon corresponding to the particular alternate drop-off or pick-up location. In some instances, the touch-sensitive display may be a touch-sensitive display screen of a mobile computing device associated with the passenger. In some other instances, the touch-sensitive display may be provided within the interior of the vehicle and configured to be viewable by passengers being transported by the vehicle. The vehicle may determine the alternate drop-off or pick-up location indicated by the passenger. The vehicle may drive to the selected alternate drop-off or pick-up location identified by the passenger. In some other instances, the vehicle may present some of the alternate drop-off or pick-up locations on a touch-sensitive display of a user device of the passenger. The passenger may interact with the user device to determine one of the alternate drop-off or pick-up locations.

Figure 8A:
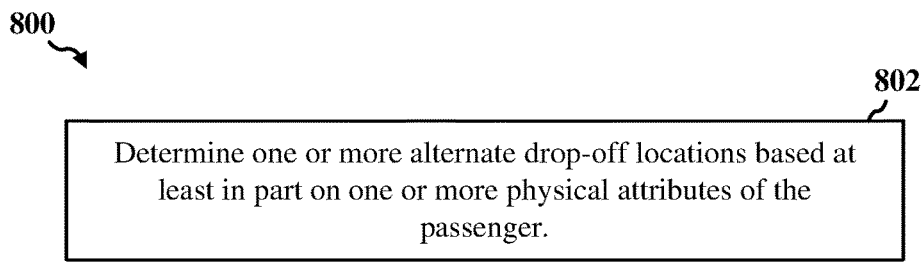
FIG. 8A shows a flowchart depicting an example operation for determining alternate drop-off locations, according to some implementations.

FIG. 8A shows a flowchart depicting an example operation 800 for determining alternate drop-off locations, according to some implementations. The operation 800 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 800 may be performed after determining the alternate drop-off or pick-up location in block 606 of FIG. 6A. For example, at block 802, the apparatus may determine one or more alternate drop-off locations based at least in part on one or more physical attributes of the passenger.

Figure 8B:
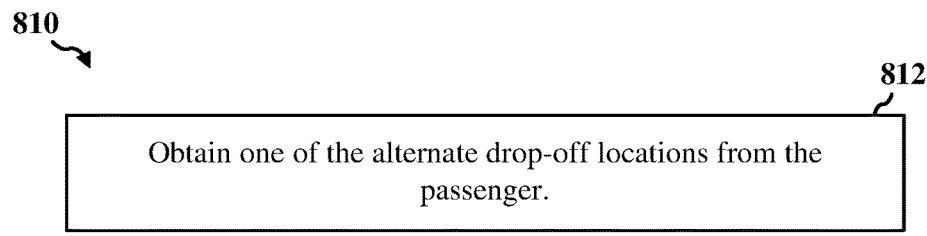
FIG. 8B shows a flowchart depicting an example operation for determining one of the alternate drop-off locations, according to some implementations.

FIG. 8B shows a flowchart depicting an example operation 810 for determining one of the alternate drop-off locations, according to some implementations. The operation 810 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 810 may be performed after determining the one or more alternate drop-off locations in block 802 of FIG. 8A. For example, at block 812, the apparatus may determine one of the alternate drop-off locations from the passenger. At block 814, the apparatus may cause the vehicle to drop off the passenger at the determined alternate drop-off location.

In one example implementation, the alternate drop-off or pick-up locations may be presented as selectable icons on the touch-sensitive display. The passenger may select a particular alternate drop-off or pick-up location by touching, tapping, or otherwise interacting with the selectable icon corresponding to the particular alternate drop-off or pick-up location. In some instances, the touch-sensitive display may be a touch-sensitive display screen of a mobile computing device associated with the passenger. In some other instances, the touch-sensitive display may be provided within the interior of the vehicle and configured to be viewable by passengers being transported by the vehicle.

Figure 9:
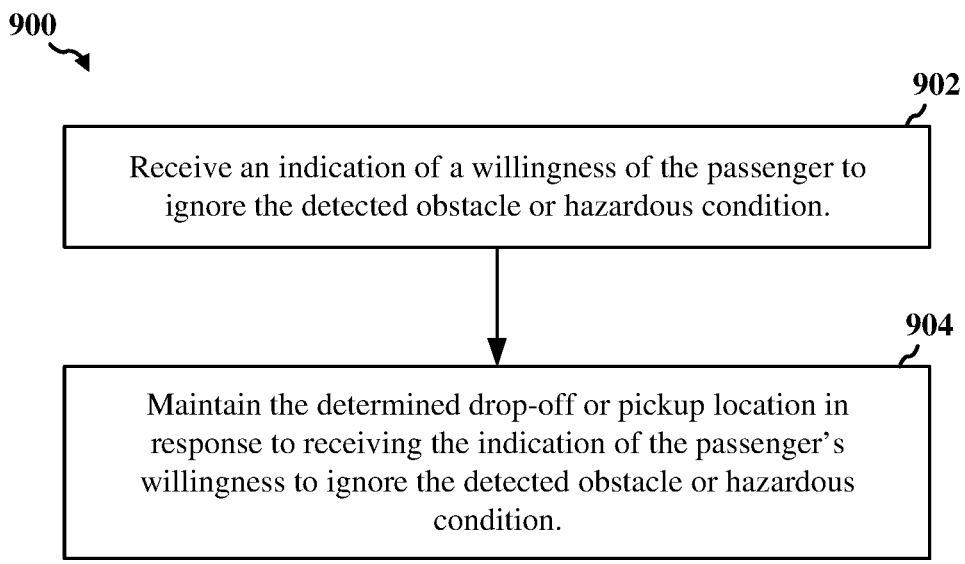
FIG. 9 shows a flow chart depicting an example operation for determining passenger drop-off or pick-up locations, according to other implementations.

FIG. 9 shows a flow chart depicting an example operation 900 for determining passenger drop-off or pick-up locations, according to some implementations. The operation 900 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 900 may be performed in conjunction with determining one of the alternate drop-off locations in block 812 of FIG. 8B. For example, at block 902, the apparatus may receive an indication of a willingness of the passenger to ignore the detected obstacle or hazardous condition. At block 904, the apparatus may maintain the determined drop-off or pick-up location in response to receiving the indication of the passenger's willingness to ignore the detected obstacle or hazardous condition. In some instances, the passenger's willingness to ignore certain obstacles or hazardous conditions can be stored in a passenger profile. In some other instances, the passenger's willingness to ignore certain obstacles or hazardous conditions can be received from the passenger.

Figure 10:
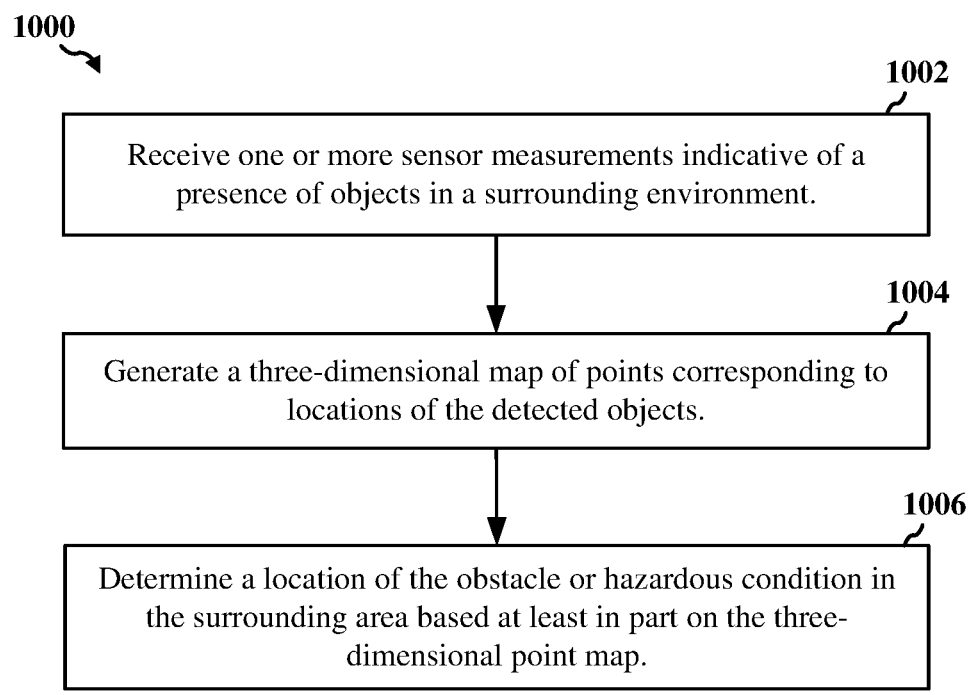
FIG. 10 shows a flow chart depicting an example operation for determining a location of an obstacle or hazardous condition, according to some implementations.

FIG. 10 shows a flow chart depicting an example operation 1000 for determining a location of an obstacle or hazardous condition, according to some implementations. The operation 1000 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 1000 may be one example of detecting whether an obstacle or hazardous condition is present at or near a site in block 604 of FIG. 6A. For example, at block 1002, the apparatus may receive one or more sensor measurements indicative of a presence of objects in a surrounding environment. At block 1004, the apparatus may generate a three-dimensional map of points corresponding to locations of the detected objects. At block 1006, the apparatus may determine a location of the obstacle or hazardous condition in the surrounding area based at least in part on the three-dimensional point map.

Figure 11:
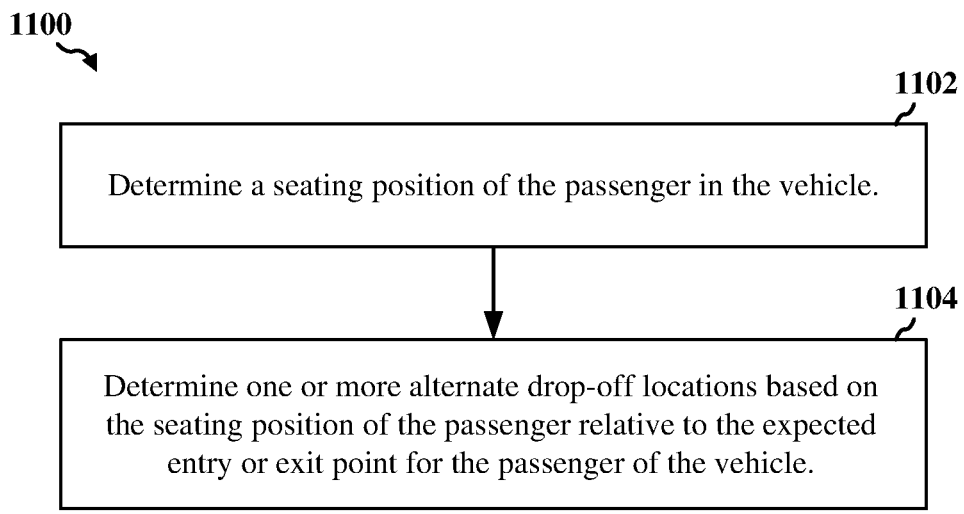
FIG. 11 shows a flow chart depicting an example operation for determining one or more alternate drop-off or pick-up locations, according to some implementations.

FIG. 11 shows a flow chart depicting an example operation 1100 for determining passenger drop-off or pick-up locations, according to some other implementations. The operation 1100 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 1100 may be performed after determining the drop-off location in block 606 of FIG. 6A. For example, at block 1102, the apparatus may determine a seating position of the passenger in the vehicle. At block 1104, the apparatus may determine one or more alternate drop-off locations based on the seating position of the passenger relative to the expected entry or exit point for the passenger of the vehicle.

Figure 12:
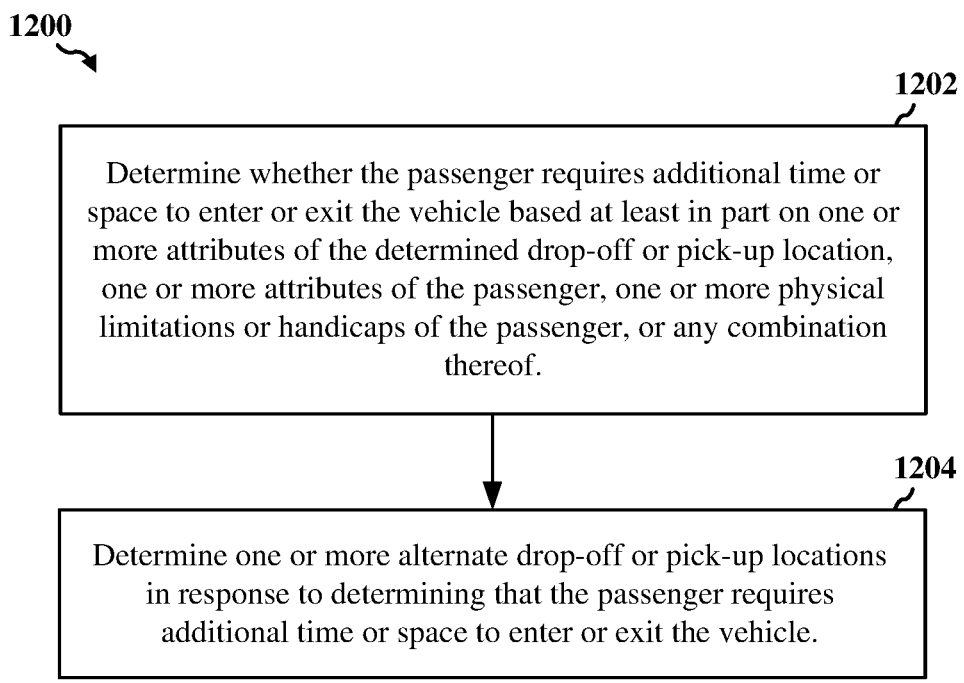
FIG. 12 shows a flow chart depicting an example operation for determining one or more alternate drop-off or pick-up locations, according to other implementations.

FIG. 12 shows a flow chart depicting an example operation 1200 for determining alternate drop-off locations, according to some other implementations. The operation 1200 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 1200 may be performed after determining the drop-off or pick-up location in block 606 of FIG. 6A. For example, at block 1202, the apparatus may determine whether the passenger requires additional time or space to enter or exit the vehicle based at least in part on one or more attributes of the determined drop-off or pick-up location, one or more attributes of the passenger, one or more physical limitations or handicaps of the passenger, or any combination thereof. At block 1204, the apparatus may determine one or more alternate drop-off or pick-up locations in response to determining that the passenger requires additional time or space to enter or exit the vehicle.

Figure 13:
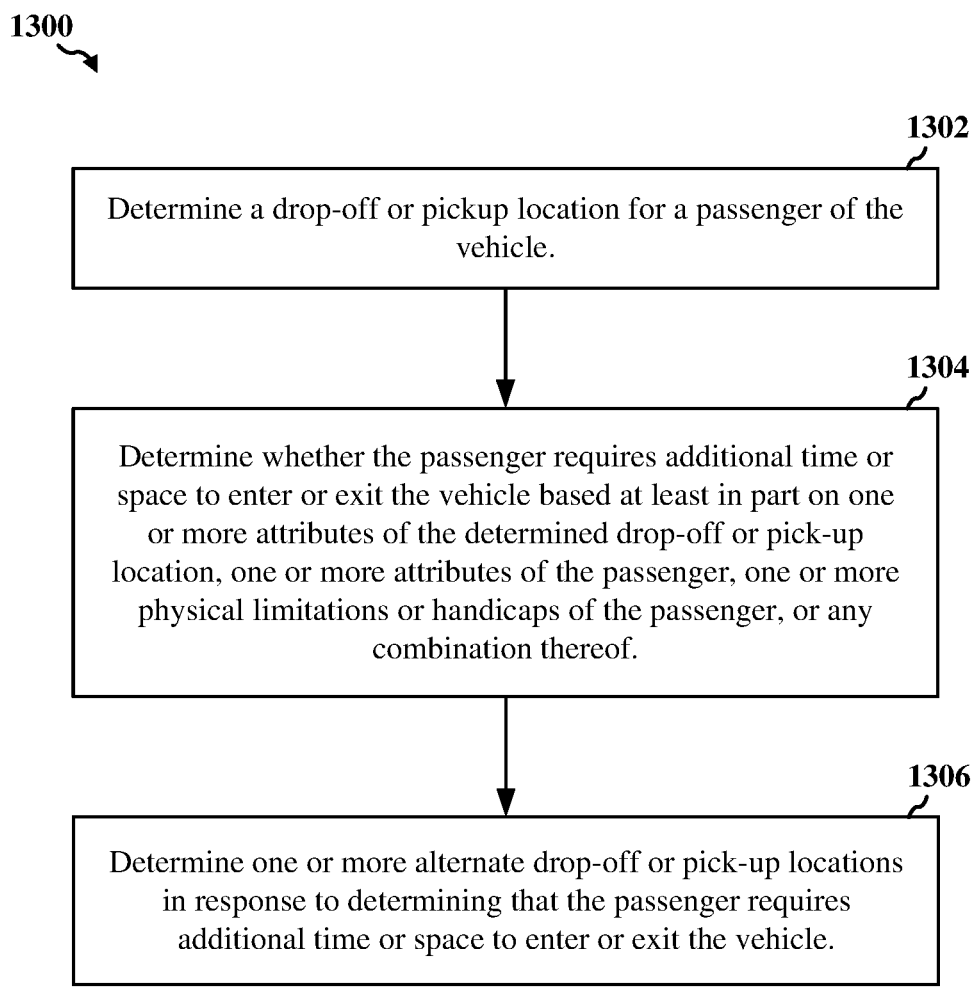
FIG. 13 shows a flow chart depicting an example operation for determining alternate drop-off locations, according to other implementations.

FIG. 13 shows a flow chart depicting an example operation 1300 for determining passenger drop-off or pick-up locations, according to some other implementations. The operation 1300 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). At block 1302, the apparatus may determine a drop-off or pick-up location for a passenger of the vehicle. At block 1304, the apparatus may determine whether the passenger requires additional time or space to enter or exit the vehicle based at least in part on one or more attributes of the determined drop-off or pick-up location, one or more attributes of the passenger, one or more physical limitations or handicaps of the passenger, or any combination thereof. At block 1306, the apparatus may determine one or more alternate drop-off or pick-up locations in response to determining that the passenger requires additional time or space to enter or exit the vehicle.

The one or more attributes of the determined drop-off or pick-up location may include a water puddle, an ice patch, a pothole, uneven pavement, high curbs, storm drains, garbage, construction barriers, other vehicles, obstructions (e.g., fire hydrants, walls, trees, etc.), weather conditions, a fire line, a no parking zone, or a closed lane within a vicinity of the identified drop-off or pick-up location, less than a certain amount of room in front of or behind the vehicle, or any combination thereof.

In some implementations, determining that the passenger requires additional time and/or space to enter or exit the vehicle may also be based on the number of passengers in the vehicle exceeding a configured value. In other implementations, determining that the passenger requires additional time and/or space to enter or exit the vehicle may also be based on a presence or an expected presence of cargo in the trunk of the vehicle, an equipment rack (such as a bike rack, a luggage rack, a ski rack, and so on) mounted on the vehicle, a presence or an expected presence of an infant or children traveling with the passenger, a presence or an expected presence of a car seat in the vehicle, or any combination thereof.

In some implementations, the vehicle may detect the one or more physical limitations or handicaps of the passenger using one or more of the sensors 372 and 376. In other implementations, the passenger may inform the vehicle (or the vehicle controller) of the one or more physical limitations or handicaps of the passenger. In some instances, the passenger may indicate the one or more physical limitations or handicaps in the passenger's profile. The vehicle can retrieve the one or more physical limitations or handicaps of the passenger by accessing the passenger's profile. In other instances, the passenger can send a notification of the one or more physical limitations or handicaps to the vehicle using a mobile computing device.

In various implementations, the additional space may be a first area proximate to a rear end of the vehicle, a second area proximate to a front end of the vehicle, a third area proximate to a passenger-side of the vehicle, a fourth area proximate to a driver-side of the vehicle, or any combination thereof.

Figure 14:
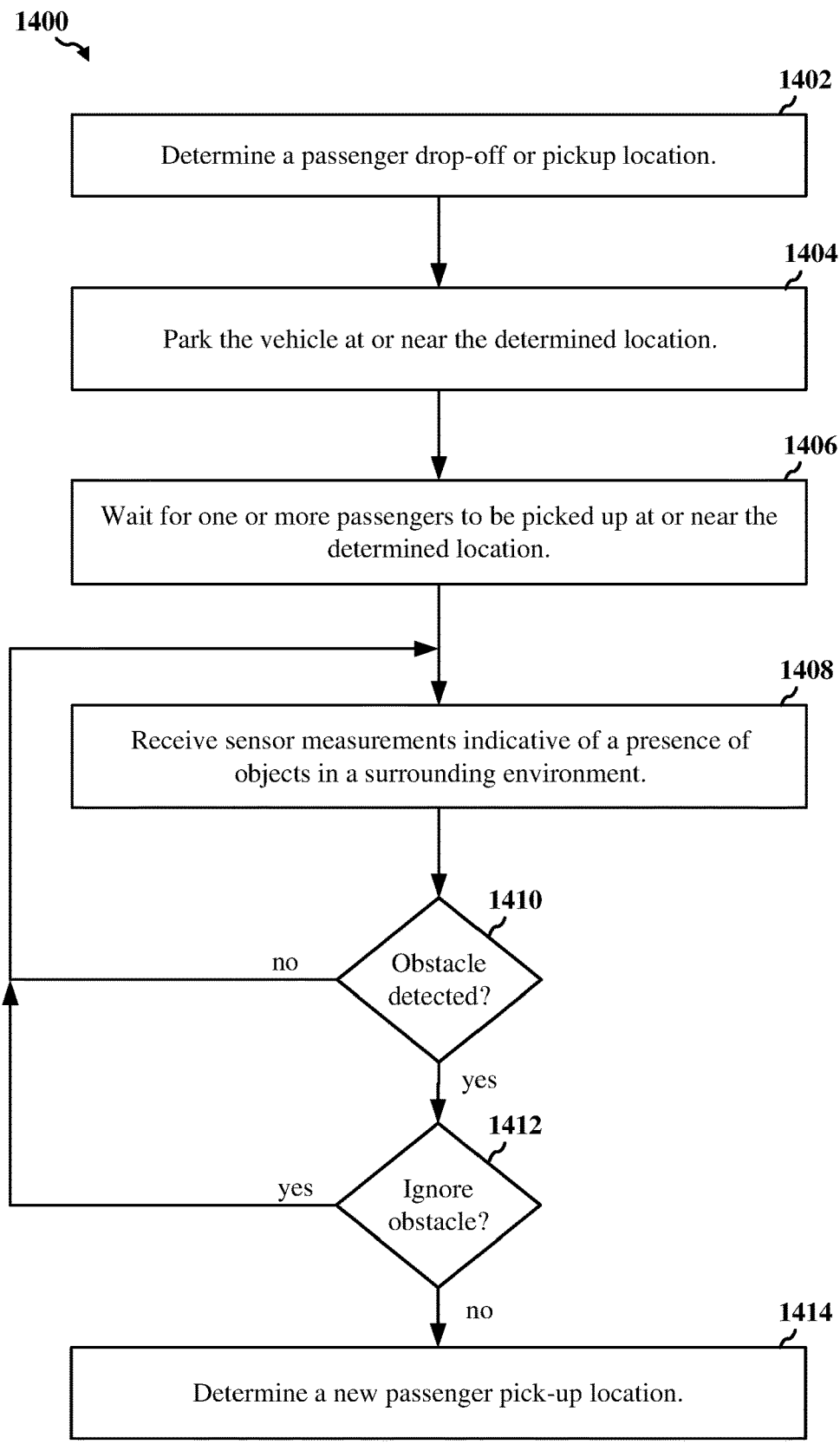
FIG. 14 shows a flow chart depicting an example operation for determining a new passenger pick-up location, according to some implementations.

FIG. 14 shows a flow chart depicting an example operation 1400 for determining passenger drop-off or pick-up locations, according to some other implementations. The operation 1400 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). At block 1402, the apparatus may determine a passenger drop-off or pick-up location. In some instances, the vehicle may be carrying one or more passengers to the determined location. In such instances, the vehicle may drop off the one or more passengers at the determined location. In various implementations, the vehicle may continuously or periodically receive one or more sensor measurements indicative of a presence of objects or hazardous conditions in a surrounding environment. The vehicle may determine an alternate drop-off location if obstacles or hazardous conditions are detected within a certain area of the determined location, for example, as described with reference to one or more of the operations 600, 700, 710, 800, 810, 900, 1000, 1100, 1200, or 1300 of FIGS. 6, 7A, 7B, 8A, 8B, 9, 10, 11, 12, 13, respectively.

At block 1404, the apparatus may cause the vehicle to park at or near the determined location. In some instances, the vehicle may be able to temporarily park (e.g., for a limited period of time) at the determined location. For example, for instances in which the vehicle drops off one or more passengers at the determined location, the vehicle may detect an available parking space at the determined location. Of course, the vehicle may also detect the available parking space when not carrying passengers to the determined location. In either scenario, the vehicle may park in the available space at the determined location. In other instances, the vehicle may park at an alternate location proximate to the determined location (such as within a certain distance of the determined location), for example, when there is not an available parking space at the determined location (or when an obstacle or hazardous condition is detected at the determined location). In some other instances, the vehicle may continue driving around an area of the determined location, for example, when there is not an available parking space at any alternate location within the certain distance of the determined location.

At block 1406, the apparatus may cause the vehicle to wait for one or more passengers to be picked up at or near the determined location. At block 1408, the apparatus may receive one or more sensor measurements indicative of a presence of objects or hazardous conditions in a surrounding environment. For example, when the vehicle parks at the determined location, the vehicle may monitor a certain area around the determined location for obstacles or hazardous conditions, may receive indications of the presence of objects or hazardous conditions, or any combination thereof. If the apparatus does not detect any obstacles or hazardous conditions, at block 1410, the apparatus may continue monitoring the surrounding environment at block 1408.

However, if the apparatus detects a presence of an obstacle or hazardous condition in the surrounding environment at block 1410 (e.g., while the vehicle waits at the determined location or the alternate location to pick up the one or more passengers), then at block 1412 the apparatus may also determine whether the detected obstacle or hazardous condition can be ignored by a respective passenger. If the detected obstacle or hazardous condition can be ignored by the respective passenger, the apparatus may continue determining whether there is a presence of other obstacles or hazardous conditions at block 1408. For example, if the apparatus detects a water puddle while the vehicle is parked at the alternate location and is to pick up the one or more passengers at the determined location, then the apparatus can ignore the water puddle (e.g., since the water puddle will not impede the passengers' path).

Conversely, if the detected obstacle or hazardous condition cannot be ignored by the respective passenger at block 1412, then at block 1414 the apparatus determines a new pick-up location. For example, if the apparatus detects uneven payment while the vehicle is parked at the determined location and is to pick up the one or more passengers at the determined location, then the apparatus may not ignore the uneven payment (e.g., since the uneven payment can impede the passengers' path to the vehicle). The determination of the new location, as well as the consideration of various passenger attributes, conditions, and/or preferences, may include any number of the operations described above.

The detected obstacle or hazardous condition may include a water puddle, an ice patch, a pothole, uneven pavement, high curbs, storm drains, garbage, construction barriers, other vehicles, obstructions (e.g., fire hydrants, walls, trees, etc.), weather conditions, a fire line, a no parking zone, a closed lane within a vicinity of the identified drop-off or pick-up location, less than a certain amount of room in front of or behind the vehicle, or any other obstacle or condition that impedes an ability of the passenger to enter or exit the vehicle. In some implementations, selection of the alternate drop-off or pick-up location may be based on an expected entry or exit point for the passenger of the vehicle, a seating position of the passenger relative to the expected entry or exit point for the passenger of the vehicle, a physical handicap or limitation of the passenger, or any combination thereof.

In some implementations, the apparatus may send a notification of the detected obstacle or hazardous condition to the passenger. The notification may be any suitable notification including (but not limited to) a push notification, a text message, an email, an automated voice call, and the like that can be sent to the passenger's mobile computing device. In some other implementations, the vehicle may drive to the alternate drop-off or pick-up location in response to detecting the presence of the obstacle or hazardous condition.

Figure 15:
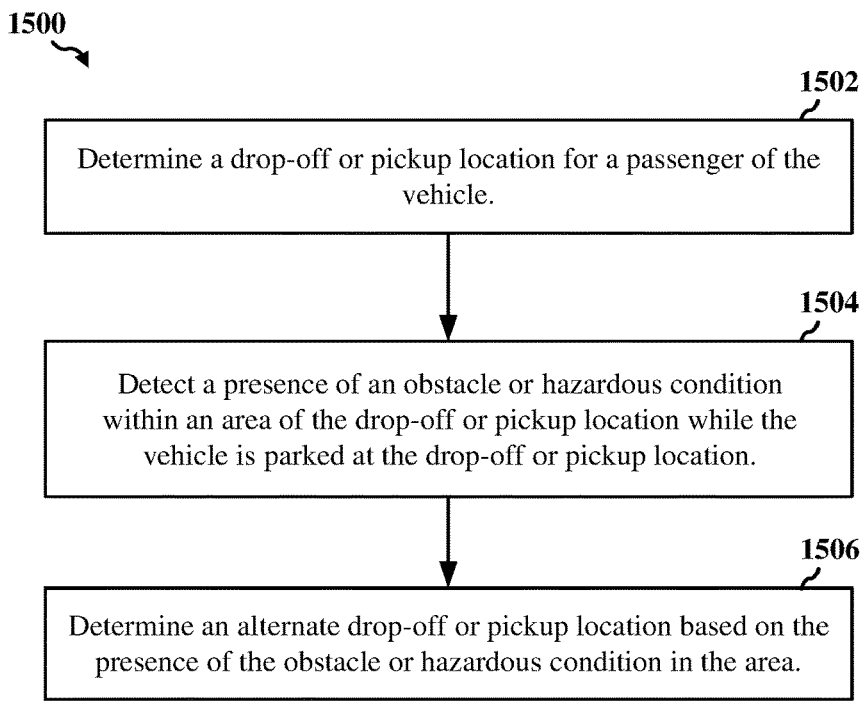
FIG. 15 shows a flow chart depicting an example operation for determining one or more alternate drop-off or pick-up locations, according to some other implementations.

FIG. 15 shows a flow chart depicting an example operation 1500 for determining passenger drop-off or pick-up locations, according to some other implementations. The operation 1500 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). At block 1502, the apparatus may determine a drop-off or pick-up location for a passenger of the vehicle. At block 1504, the apparatus may detect a presence of an obstacle or hazardous condition within an area of the drop-off or pick-up location while the vehicle is within a distance of the drop-off or pick-up location. At block 1506, the apparatus may determine an alternate drop-off or pick-up location based on the presence of the obstacle or hazardous condition in the area.

Figure 16:
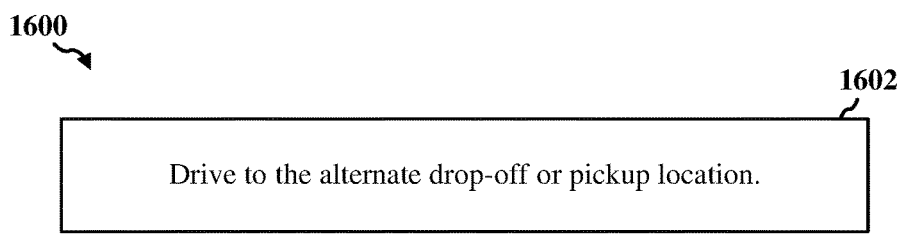
FIG. 16 shows a flow chart depicting an example operation for determining passenger drop-off or pick-up locations, according to some other implementations.

FIG. 16 shows a flow chart depicting an example operation 1600 for determining passenger drop-off or pick-up locations, according to some other implementations. The operation 1600 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 1600 may be performed after determining the drop-off or pick-up location in block 1502 of FIG. 15. For example, at block 1602, the vehicle may drive the passenger to the alternate drop-off or pickup location.

Figure 17:
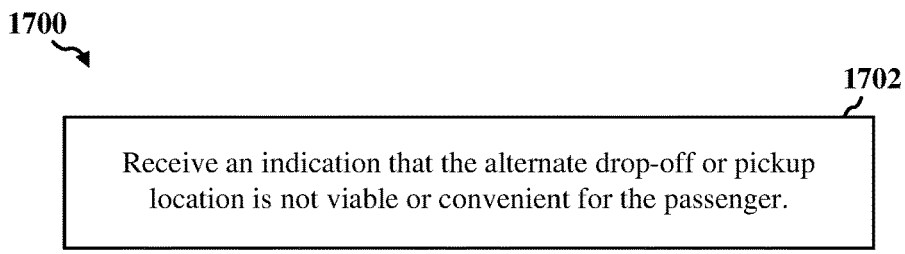
FIG. 17 shows a flow chart depicting an example operation for receiving an indication from a passenger, according to some implementations.

FIG. 17 shows a flow chart depicting an example operation 1700 for determining passenger drop-off or pick-up locations, according to some other implementations. The operation 1700 may be performed by an apparatus such as (but not limited to) the vehicle controller 310 of FIG. 3 in conjunction with a vehicle such as (but not limited to) the autonomous vehicle 300 of FIG. 3. In some instances, the apparatus may be implemented within the vehicle. In other instances, the apparatus may be external to the vehicle. In some other aspects, the apparatus may be the vehicle (or at least a part of the vehicle). In some implementations, the operation 1700 may be performed after determining the drop-off or pick-up location in block 1502 of FIG. 15. For example, at block 1702, the apparatus may receive an indication that the drop-off or pick-up location is not viable or convenient for the passenger. The apparatus may determine the alternate drop-off or pick-up location based, at least in part, on the received indication.

Implementation examples are described in the following numbered clauses:

1. An apparatus, including:
   a memory; and
   one or more processors communicably coupled to the memory, the one or more processors configured to:
   determine an expected entry or exit point for a passenger of a vehicle;
   detect whether an obstacle or hazardous condition is present at or near a site; and
   in response to detecting that the obstacle or hazardous condition is present at or near the site, determine a drop-off or pick-up location associated with the site based at least in part on a position of the expected entry or exit point for the passenger of the vehicle and the detected obstacle or hazardous condition.
2. The apparatus of clause 1, where the detected obstacle or hazardous condition includes a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.
3. The apparatus of any of clauses 1-2, where determining the drop-off or pick-up location is further based on a seating position of the passenger.
4. The apparatus of any of clauses 1-3, where determining the drop-off or pick-up location is based on whether the expected entry or exit point for the passenger of the vehicle and the detected obstacle or hazardous condition are on a same side of the vehicle.
5. The apparatus of any of clauses 1-4, where the one or more processors are further configured to:
determine an alternate drop-off or pick-up location from a plurality of different alternate drop-off or pick-up locations within a distance of the determined drop-off or pick-up location.
6. The apparatus of clause 5, where the plurality of different alternate drop-off or pick-up locations are based on map data, coherent light sensing system data, images of the surrounding area, video of the surrounding area, RADAR, passenger input, or any combination thereof.
7. The apparatus of clause 5, where the plurality of different alternate drop-off or pick-up locations are based at least in part on a physical limitation of the passenger, an age of the passenger, a presence of infants or children with the passenger, or any combination thereof.
8. The apparatus of clause 5, where the one or more processors are further configured to:
receive one or more preferred drop-off or pick-up locations from a plurality of different alternate drop-off or pick-up locations; and
determine the alternate drop-off or pick-up location based on the one or more preferred drop-off or pick-up locations.
9. The apparatus of any of clauses 1-8, where the one or more processors are further configured to:
determine one or more alternate drop-off locations based at least in part on one or more physical attributes of the passenger.
10. The apparatus of clause 9, where the one or more processors are further configured to:
obtain one of the alternate drop-off locations from the passenger.
11. The apparatus of any of clauses 1-10, further including a vehicle controller implemented within the vehicle.
12. The apparatus of any of clauses 1-10, further including a vehicle controller implemented in a server or cloud-based vehicle control system.
13. The apparatus of any of clauses 1-12, where the one or more processors are further configured to:
receive an indication of a willingness of the passenger to ignore the detected obstacle or hazardous condition; and
maintain the determined drop-off or pick-up location in response to receiving the indication of the passenger's willingness to ignore the detected obstacle or hazardous condition.
14. The apparatus of any of clauses 1-14, where detecting the obstacle or hazardous condition includes:
receiving one or more sensor measurements indicative of a presence of objects in a surrounding environment;
generating a three-dimensional map of points corresponding to locations of the detected objects; and
determining a location of the obstacle or hazardous condition in the surrounding area based on the three-dimensional point map.
15. The apparatus of any of clauses 1-14, where the one or more processors are further configured to:
determine a seating position of the passenger in the vehicle; and
determine one or more alternate drop-off locations based on the seating position of the passenger relative to the expected entry or exit point for the passenger of the vehicle.
16. The apparatus of clause 15, where the determination of the one or more alternate drop-off locations is based on determining that the seating position of the passenger and the expected entry or exit point are on a same side of the vehicle, irrespective of the seating position of one or more other passengers in the vehicle.

17. The apparatus of any of clauses 1-16, where the one or more processors are further configured to:
determine whether the passenger requires additional time or space to enter or exit the vehicle based at least in part on one or more attributes of the determined drop-off or pick-up location, one or more attributes of the passenger, one or more physical limitations or handicaps of the passenger, or any combination thereof; and
determine one or more alternate drop-off or pick-up locations in response to determining that the passenger requires additional time or space to enter or exit the vehicle.

18. A method for controlling one or more operations of a vehicle, including:
determining an expected entry or exit point for a passenger of a vehicle;
detecting whether an obstacle or hazardous condition is present at or near a site; and
in response to detecting that the obstacle or hazardous condition is present at or near the site, determining a drop-off or pick-up location associated with the site based at least in part on a position of the expected entry or exit point for the passenger of the vehicle and the detected obstacle or hazardous condition.

19. The method of clause 18, where the detected obstacle or hazardous condition includes a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.

20. The method of any of clauses 18-19, where determining the drop-off or pick-up location is based on a seating position of the passenger.

21. The method of any of clauses 18-20, where determining the drop-off or pick-up location is based on whether the expected entry or exit point for the passenger of the vehicle and the detected obstacle or hazardous condition are on a same side of the vehicle.

22. The method of clause 22, further including:
receiving one or more preferred drop-off or pick-up locations from a plurality of different alternate drop-off or pick-up locations; and
determining the alternate drop-off or pick-up location based on the one or more preferred drop-off or pick-up locations.

23. The method of any of clauses 18-21, further including:
determining one or more alternate drop-off locations based at least in part on one or more physical attributes of the passenger.

24. The of any of clauses 18-21, further including:
determining a seating position of the passenger in the vehicle; and
determining one or more alternate drop-off locations based on the seating position of the passenger relative to the expected entry or exit point for the passenger of the vehicle.

25. A system, including:
means for determining an expected entry or exit point for a passenger of a vehicle;
means for detecting whether an obstacle or hazardous condition is present at or near a site; and
means for determining, in response to detecting that the obstacle or hazardous condition is present at or near the site, a drop-off or pick-up location associated with the site based at least in part on a position of the expected entry or exit point for the passenger of the vehicle and the detected obstacle or hazardous condition.

26. The system of clause 25, further including:
means for determining one or more alternate drop-off locations based at least in part on one or more physical attributes of the passenger.

27. The system of any of clauses 25-26, further including:
means for determining a seating position of the passenger in the vehicle; and
means for determining one or more alternate drop-off locations based on the seating position of the passenger relative to the expected entry or exit point for the passenger of the vehicle.

28. A non-transitory computer-readable medium storing instructions for controlling a vehicle, where execution of the instructions by one or more processors of an apparatus causes the vehicle to perform operations including:
determining an expected entry or exit point for a passenger of the vehicle;
detecting whether an obstacle or hazardous condition is present at or near a site; and
in response to detecting that the obstacle or hazardous condition is present at or near the site, determining a drop-off or pick-up location associated with the site based at least in part on a position of the expected entry or exit point for the passenger of the vehicle and the detected obstacle or hazardous condition.

29. The non-transitory computer-readable medium of clause 28, where execution of the instructions by the one or more processors causes the vehicle to perform operations further including:
determining one or more alternate drop-off locations based at least in part on one or more physical attributes of the passenger.

30. The non-transitory computer-readable medium of any of clauses 28-29, where execution of the instructions by the one or more processors causes the vehicle to perform operations further including:
determining a seating position of the passenger in the vehicle; and
determining one or more alternate drop-off locations based on the seating position of the passenger relative to the expected entry or exit point for the passenger of the vehicle.

31. An apparatus, including:
a memory; and
one or more processors communicably coupled to the memory, the one or more processors configured to:
determine a drop-off or pick-up location for a passenger of a vehicle;
determine whether the passenger requires additional time or space to enter or exit the vehicle based at least in part on one or more attributes of the determined drop-off or pick-up location, one or more physical attributes of the passenger, one or more physical limitations or handicaps of the passenger, or any combination thereof; and
determine one or more alternate drop-off or pick-up locations in response to determining that the passenger requires additional time or space to enter or exit the vehicle.

32. The apparatus of clause 31, where the one or more attributes of the determined drop-off or pick-up location includes a water puddle, an ice patch, a pothole, uneven pavement, high curbs, storm drains, garbage, construction barriers, other vehicles, weather conditions, a fire line, a no parking zone, a closed lane within a vicinity of the identified drop-off or pick-up location, less than a certain amount of room in front of or behind the vehicle, or any combination thereof.

33. The apparatus of any of clauses 31-32, where determining whether the passenger requires additional time or space to enter or exit the vehicle is further based on a presence or an expected presence of cargo in the trunk of the vehicle, an equipment rack mounted on the vehicle, a presence or an expected presence of an infant or children traveling with the passenger, a presence or an expected presence of a car seat in the vehicle, or any combination thereof.

34. The apparatus of any of clauses 31-33, where the space includes a first area proximate to a rear end of the vehicle, a second area proximate to a front end of the vehicle, a third area proximate to a passenger-side of the vehicle, a fourth area proximate to a driver-side of the vehicle, or any combination thereof.

35. The apparatus of any of clauses 31-34, where the alternate drop-off or pick-up location is determined from a plurality of alternate drop-off or pick-up locations within a distance of the determined drop-off or pick-up location.

36. The apparatus of any of clauses 31-35, where determining the one or more alternate drop-off or pick-up locations includes:
present the alternate drop-off or pick-up locations on a display screen viewable by the passenger;
receive an indication of one of the presented alternate drop-off or pick-up locations from the passenger; and
determine the drop-off or pick-up location in response to the received indication.

37. The apparatus of any of clauses 31-36, where determining that the at least one passenger requires additional time or space includes receiving an indication from a mobile computing device associated with the passenger.

38. An apparatus, including:
a memory; and
one or more processors communicably coupled to the memory, the one or more processors configured to:
determine a passenger drop-off or pickup location for a passenger of a vehicle;
park the vehicle at or near the determined location;
wait for one or more passengers to be picked up at or near the determined location;
receive sensor measurements indicative of a presence of objects in a surrounding environment; and
determine a new passenger pick-up location in response to the presence of objects in a surrounding environment.

39. The apparatus of clause 38, where the detected obstacle or hazardous condition includes a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.

40. The apparatus of any of clauses 38-39, where the determination of the alternate drop-off or pickup location is based on an expected entry or exit point for the passenger of the vehicle, a seating position of the passenger relative to the expected entry or exit point for the passenger of the vehicle, a physical handicap or limitation of the passenger, or any combination thereof.

41. The apparatus of any of clauses 38-40, where the determination of the alternate drop-off or pickup location is based on whether the passenger requires additional time or space to enter or exit the vehicle.

42. The apparatus of clause 41, where the additional space includes a first area proximate to a rear end of the vehicle, a second area proximate to a front end of the vehicle, a third area proximate to a passenger-side of the vehicle, a fourth area proximate to a driver-side of the vehicle, or any combination thereof.

43. An apparatus, including:
a memory; and
one or more processors communicably coupled to the memory, the one or more processors configured to:
determine a drop-off or pickup location for a passenger of a vehicle;
detect a presence of an obstacle or hazardous condition within an area of the drop-off or pickup location while the vehicle is parked at the drop-off or pickup location; and
determine an alternate drop-off or pickup location based on the presence of the obstacle or hazardous condition in the area.

44. The apparatus of clause 43, where the detected obstacle or hazardous condition includes a water puddle, an ice patch, a pothole, uneven pavement, high curbs, storm drains, garbage, construction barriers, other vehicles, obstructions, weather conditions, a fire line, a no parking zone, a closed lane within a vicinity of the identified drop-off or pick-up location, less than a certain amount of room in front of or behind the vehicle, or any combination thereof.

45. The apparatus of any of clauses 43-44, where the determination of the alternate drop-off or pickup location is based on an expected entry or exit point for the passenger of the vehicle, a seating position of the passenger relative to the expected entry or exit point for the passenger of the vehicle, a physical handicap or limitation of the passenger, or any combination thereof.

46. The apparatus of any of clauses 43-45, where the determination of the alternate drop-off or pickup location is based on whether the passenger requires additional time or space to enter or exit the vehicle.

47. The apparatus of any of clauses 43-46, where the one or more processors are further configured to:
drive to the alternate drop-off or pickup location.

48. The apparatus of clause 47, where the one or more processors are further configured to:
receive an indication that the alternate drop-off or pickup location is not viable or convenient for the passenger.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An apparatus, comprising:
   memory; and
   one or more processors communicably coupled to the memory, the one or more processors configured to:
   determine an expected entry point or an expected exit point for a passenger of a vehicle;
   detect whether an obstacle or a hazardous condition is present at or near a site associated with the expected entry point or the expected exit point for the passenger of the vehicle;
   in response to the detection that the obstacle or the hazardous condition is present at or near the site, determine a drop-off location or a pick-up location associated with the site based at least in part on a position of the expected entry point or the expected exit point for the passenger of the vehicle and the obstacle or the hazardous condition;
   determine a seating position of the passenger of the vehicle;
   receive, from a server, information about characteristics of at least one second vehicle expected to be at or near the expected entry point or the expected exit point;
   determine an alternative drop-off location or an alternative pick-up location based on (1) the seating position of the passenger of the vehicle, (2) the expected entry point or the expected exit point being on a same side of the vehicle, and (3) the received information, irrespective of a seating position of one or more other passengers in the vehicle at a same time as the passenger of the vehicle; and
   control the vehicle to navigate to the alternative drop-off location or the alternative pick-up location.

2. The apparatus of claim 1, wherein the obstacle or the hazardous condition includes at least one of a water puddle, an ice patch, a pothole, uneven pavement, curbs, storm drains, garbage, construction barriers, other vehicles, obstructions, weather conditions, a fire line, a no parking zone, a closed lane within a vicinity of the drop-off location or the pick-up location, or less than a certain amount of room in front of or behind the vehicle.

3. The apparatus of claim 1, wherein to determine the drop-off location or the pick-up location, the one or more processors are configured to determine the drop-off location or the pick-up location further based on the seating position of the passenger.

4. The apparatus of claim 1, wherein to determine the drop-off location or the pick-up location, the one or more processors are configured to determine the drop-off location or the pick-up location based on whether the expected entry point or the expected exit point for the passenger of the vehicle and the obstacle or the hazardous condition are on the same side of the vehicle.

5. The apparatus of claim 1, wherein to determine the alternate drop- off location or the alternate pick-up location, the one or more processors are configured to:
   determine the alternate drop-off location or the alternate pick-up location from a plurality of different alternate drop-off or pick-up locations within a distance of the drop-off location or the pick-up location.

6. The apparatus of claim 5, wherein the plurality of different alternate drop-off or pick-up locations are based on at least one of map data, coherent light sensing system data, images of a surrounding area, video of the surrounding area, RADAR, or passenger input.

7. The apparatus of claim 5, wherein the plurality of different alternate drop-off or pick-up locations are based at least in part on at least one of a physical limitation of the passenger, an age of the passenger, or a presence of infants or children with the passenger.

8. The apparatus of claim 5, wherein the one or more processors are further configured to:
receive one or more preferred drop-off or pick-up locations from the plurality of different alternate drop-off or pick-up locations, wherein to determine the alternate drop-off location or the alternate pick-up location, the one or more processors are configured to determine the alternate drop-off location or the alternate pick-up location based on the one or more preferred drop-off or pick-up locations.

9. The apparatus of claim 1, wherein to determine the alternate drop-off location or the alternate pick-up location, the one or more processors are configured to:
determine one or more alternate drop-off locations based at least in part on one or more physical attributes of the passenger.

10. The apparatus of claim 9, wherein the one or more processors are further configured to:
obtain one of the one or more alternate drop-off locations from the passenger.

11. The apparatus of claim 1, wherein the apparatus comprises a vehicle controller implemented within the vehicle.

12. The apparatus of claim 1, wherein the apparatus comprises a vehicle controller implemented in a server or cloud-based vehicle control system.

13. The apparatus of claim 1, wherein the one or more processors are further configured to:
receive an indication of a willingness of the passenger to ignore the obstacle or the hazardous condition; and
maintain the drop-off location or the pick-up location in response to reception of the indication of the willingness of the passenger to ignore the obstacle or the hazardous condition.

14. The apparatus of claim 1, wherein to detect the obstacle or the hazardous condition, the one or more processors are configured to:
receive one or more sensor measurements indicative of a presence of objects in a surrounding environment;
generate a three-dimensional map of points corresponding to locations of the objects; and
determine a location of the obstacle or the hazardous condition in the surrounding environment based on the three-dimensional point map.

15. The apparatus of claim 1, wherein the one or more processors are further configured to:
determine whether the passenger requires additional time or additional space to enter or exit the vehicle based at least in part on at least one of one or more attributes of the drop-off location or the pick-up location, one or more attributes of the passenger, one or more physical limitations or handicaps of the passenger wherein to determine the alternative drop-off location or the alternative pick-up location, the one or more processors are configured to determine the alternative drop-off location or the alternative pick-up location determine the alternate drop-off or the alternate pick-up locations in response to the determination that the passenger requires the additional time or the additional space to enter or exit the vehicle.

16. A method for controlling one or more operations of a vehicle, comprising:
determining an expected entry point or an expected exit point for a passenger of the vehicle;
detecting whether an obstacle or a hazardous condition is present at or near a site associated with the expected entry point or the expected exit point for the passenger of the vehicle;
in response to detecting that the obstacle or the hazardous condition is present at or near the site, determining a drop-off location or a pick-up location associated with the site based at least in part on a position of the expected entry point or the expected exit point for the passenger of the vehicle and the obstacle or the hazardous condition;
determining a seating position of the passenger of the vehicle;
receiving, from a server, information about characteristics of at least one second vehicle expected to be at or near the expected entry point or the expected exit point;
determining an alternative drop-off location or an alternative pick-up location based on (1) the seating position of the passenger of the vehicle, (2) the expected entry point or the expected exit point being on a same side of the vehicle, and (3) the received information, irrespective of a seating position of one or more other passengers in the vehicle at a same time as the passenger of the vehicle; and
controlling the vehicle to navigate to the alternative drop-off location or the alternative pick-up location.

17. The method of claim 16, wherein the obstacle or the hazardous condition includes at least one of a water puddle, an ice patch, a pothole, uneven pavement, curbs, storm drains, garbage, construction barriers, other vehicles, obstructions, weather conditions, a fire line, a no parking zone, a closed lane within a vicinity of the drop-off location or the pick-up location, or less than a certain amount of room in front of or behind the vehicle.

18. The method of claim 16, wherein determining the drop-off location or the pick-up location is based on the seating position of the passenger.

19. The method of claim 16, wherein determining the drop-off location or the pick-up location is based on whether the expected entry point or the expected exit point for the passenger of the vehicle and the obstacle or the hazardous condition are on the same side of the vehicle.

20. The method of claim 19, further comprising:
receiving one or more preferred drop-off locations or preferred pick-up locations from a plurality of different alternate drop-off locations or pick-up locations, wherein determining the alternate drop-off location or the alternate pick-up location is based on the one or more preferred drop-off locations or preferred pick-up locations.

21. The method of claim 16, wherein determining the alternate drop- off location or the alternative pick-up location comprises determining one or more alternate drop- off locations based at least in part on one or more physical attributes of the passenger.

22. The method of claim 21, wherein the one or more alternate drop-off locations are based on at least one of map data, coherent light sensing system data, images of a surrounding area, video of the surrounding area, RADAR, or passenger input.

23. The method of claim 21, wherein the one or more alternate drop-off locations are based at least in part on at least one of a physical limitation of the passenger, an age of the passenger, or a presence of infants or children with the passenger.

24. The method of claim 16, further comprising:
receiving an indication of a willingness of the passenger to ignore the obstacle or the hazardous condition; and
maintaining the drop-off location or the pick-up location in response to reception of the indication of the willingness of the passenger to ignore the obstacle or the hazardous condition.

25. The method of claim 16, wherein detecting the obstacle or the hazardous condition comprises:
receiving one or more sensor measurements indicative of a presence of objects in a surrounding environment;
generating a three-dimensional map of points corresponding to locations of the detected objects; and
determining a location of the obstacle or the hazardous condition in the surrounding environment based on the three-dimensional point map.

26. The method of claim 16, further comprising:
determining whether the passenger requires additional time or additional space to enter or exit the vehicle based at least in part on at least one of one or more attributes of the drop-off location or the pick-up location, one or more attributes of the passenger, one or more physical limitations or handicaps of the passenger, wherein determining the alternative drop-off location or the alternative pick-up location comprises determining the alternative drop-off location or the alternative pick-up location in response to the determination that the passenger requires the additional time or the additional space to enter or exit the vehicle.

27. A system, comprising:
means for determining an expected entry point or an expected exit point for a passenger of a vehicle;
means for detecting whether an obstacle or a hazardous condition is present at or near a site associated with the expected entry point or the expected exit point for the passenger of the vehicle;
means for determining, in response to detecting that the obstacle or the hazardous condition is present at or near the site, a drop-off location or a pick-up location associated with the site based at least in part on a position of the expected entry point or the expected exit point for the passenger of the vehicle and the obstacle or the hazardous condition;
means for determining a seating position of the passenger of the vehicle;
means for receiving, from a server, information about characteristics of at least one second vehicle expected to be at or near the expected entry point or the expected exit point;
means for determining an alternative drop-off location or an alternative pick-up location based on (1) the seating position of the passenger of the vehicle, (2) the expected entry point or the expected exit point being on a same side of the vehicle, and (3) the received information, irrespective of a seating position of one or more other passengers in the vehicle at a same time as a passenger of the vehicle; and
means for controlling the vehicle to navigate to the alternative drop-off location or the alternative pick-up location.

28. The system of claim 27, wherein the means for determining the alternate drop-off location or the alternate pick-up location comprise means for determining one or more alternate drop-off locations based at least in part on one or more physical attributes of the passenger.

29. A non-transitory computer-readable medium storing instructions for controlling a vehicle, wherein execution of the instructions by one or more processors of an apparatus causes the vehicle to:
determine an expected entry point or an expected exit point for a passenger of the vehicle;
detect whether an obstacle or a hazardous condition is present at or near a site associated with the expected entry point or the expected exit point for the passenger of the vehicle;
in response to the detection that the obstacle or the hazardous condition is present at or near the site, determine a drop-off location or a pick-up location associated with the site based at least in part on a position of the expected entry point or the expected exit point for the passenger of the vehicle and the obstacle or the hazardous condition;
determine a seating position of the passenger of the vehicle;
receive, from a server, information about characteristics of at least one second vehicle expected to be at or near the expected entry point or the expected exit point;
determine an alternative drop-off location or an alternative pick-up location based on (1) the seating position of the passenger of the vehicle, (2) the expected entry point or the expected exit point being on a same side of the vehicle, and (3) the received information, irrespective of a seating position of one or more other passengers in the vehicle at a same time as the passenger of the vehicle; and
control the vehicle to navigate to the alternative drop-off location or the alternative pick-up location as the passenger and the one or more other passengers are in the vehicle.

30. The non-transitory computer-readable medium of claim 29, wherein to determine the alternative drop-off location or the alternate pick-up location, the execution of the instructions by the one or more processors causes the vehicle to:
determine one or more alternate drop-off locations based at least in part on one or more physical attributes of the passenger.

* * * * *